(12) United States Patent
Cantin

(10) Patent No.: US 11,480,509 B2
(45) Date of Patent: *Oct. 25, 2022

(54) SYSTEM AND METHOD FOR INDIVIDUAL PARTICLE SIZING USING LIGHT SCATTERING TECHNIQUES

(71) Applicant: INSTITUT NATIONAL D'OPTIQUE, Québec (CA)

(72) Inventor: Daniel Cantin, Québec (CA)

(73) Assignee: INSTITUT NATIONAL D'OPTIQUE, Québec (CA)

( * ) Notice: Subject to any disclaimer, the term of this patent is extended or adjusted under 35 U.S.C. 154(b) by 443 days.

This patent is subject to a terminal disclaimer.

(21) Appl. No.: 16/856,915

(22) Filed: Apr. 23, 2020

(65) Prior Publication Data

US 2020/0256779 A1    Aug. 13, 2020

Related U.S. Application Data

(63) Continuation of application No. 15/764,833, filed as application No. PCT/CA2015/050995 on Oct. 2, 2015, now Pat. No. 10,634,598.

(51) Int. Cl.
*G01N 15/02* (2006.01)
*G01N 15/14* (2006.01)
(Continued)

(52) U.S. Cl.
CPC ......... *G01N 15/0211* (2013.01); *G01N 15/06* (2013.01); *G01N 15/1459* (2013.01);
(Continued)

(58) Field of Classification Search
CPC ............... G01N 15/06; G01N 15/1459; G01N 2015/0046; G01N 2015/0693;
(Continued)

(56) References Cited

U.S. PATENT DOCUMENTS 2,769,365 A    11/1956   Loeschecke et al.
3,361,030 A    1/1968    Goldberg
(Continued)

FOREIGN PATENT DOCUMENTS

CN    1932475 A      3/2007
CN    103454203 A    12/2013
(Continued)

OTHER PUBLICATIONS

Paul A. Webb, "A Primer on Particle Sizing by Static Laser Light Scattering", Micromeritics Instrument Corp., Jan. 2000, 82 pages.
(Continued)

*Primary Examiner* — Dominic J Bologna
*Assistant Examiner* — Amanda Merlino
(74) *Attorney, Agent, or Firm* — MH2 Technology Law Group, LLP

(57) ABSTRACT

A particle sizing system is provided that includes an optical source generating a light beam for illuminating particles in a monitored volume, a plurality of light deflectors, each positioned to receive and deflect light scattered by the particles, and an image capture device collecting scattered light deflected by each light deflector. The image capture device outputs an image including a plurality of sub-images, each generated from the collected light deflected from a respective one of the light deflectors. Each particle is imaged as a spot in each sub-image, the plurality of spots associated with each particle corresponding to a plurality of scattering angles. The system also includes a processing unit configured to identify the spots associated with each particle in the sub-images, compute a spot parameter associated with each spot, and determine the size of each particle from its related spot parameters. A particle sizing method is also provided.

19 Claims, 25 Drawing Sheets

(51) Int. Cl.
  *G01N 15/06* (2006.01)
  *G01N 21/49* (2006.01)
  *G01N 15/00* (2006.01)

(52) U.S. Cl.
  CPC ..... *G01N 21/49* (2013.01); *G01N 2015/0046* (2013.01); *G01N 2015/0693* (2013.01); *G01N 2015/1486* (2013.01)

(58) Field of Classification Search
  CPC .......... G01N 2015/1486; G01N 21/49; G01N 15/0205; G01N 15/0211; G01N 15/0227
  See application file for complete search history.

(56) References Cited

U.S. PATENT DOCUMENTS

| | | |
|---|---|---|
| 3,431,423 A | 3/1969 | Keller |
| 3,835,315 A | 9/1974 | Gravitt, Jr. |
| 3,871,769 A | 3/1975 | Engel et al. |
| 3,873,206 A | 3/1975 | Wilcock |
| 4,037,965 A | 7/1977 | Weiss |
| 4,140,395 A | 2/1979 | Kreikebaum |
| 4,188,121 A | 2/1980 | Hirleman, Jr. et al. |
| 4,211,487 A | 7/1980 | Morrison et al. |
| 4,286,876 A | 9/1981 | Hogg et al. |
| 4,387,993 A | 6/1983 | Adrian |
| 4,492,467 A | 1/1985 | Drain et al. |
| 4,735,504 A | 4/1988 | Tycko |
| 4,854,705 A | 8/1989 | Bachalo |
| 4,893,929 A | 1/1990 | Miyamoto |
| 5,094,532 A | 3/1992 | Trainer et al. |
| 5,125,737 A | 6/1992 | Rodriguez et al. |
| 5,461,476 A | 10/1995 | Fournier |
| 6,067,157 A | 5/2000 | Altendorf |
| 6,104,491 A | 8/2000 | Trainer |
| 6,177,983 B1 | 1/2001 | Trainer |
| 6,177,994 B1 | 1/2001 | Watson et al. |
| 6,236,458 B1 | 5/2001 | Igushi et al. |
| 6,507,400 B1 | 1/2003 | Pina et al. |
| 6,760,107 B1 | 7/2004 | Drake |
| 7,349,084 B2 | 3/2008 | Kusuzawa |
| 7,554,661 B2 | 6/2009 | Adams et al. |
| 8,154,723 B2 | 4/2012 | Fu et al. |
| 8,634,072 B2 | 1/2014 | Trainer |
| 8,675,195 B2 | 3/2014 | Ihlefeld et al. |
| 10,634,598 B2 * | 4/2020 | Cantin ............... G01N 15/0211 |
| 2013/0252237 A1 | 9/2013 | Wagner |

FOREIGN PATENT DOCUMENTS

| | | |
|---|---|---|
| EP | 1507136 A1 | 2/2005 |
| WO | 2010031161 A1 | 3/2010 |

OTHER PUBLICATIONS

Chizhu Ding et al., "An improved particle-sizing approach based on optical diffraction tomography", Europhysics Letters (EPL), May 2013, vol. 102, pp. 44003-p1-44003-p4.

Dr. Anne Virden, "The importance of particle size to spray hazard analysis", Spray Technology and Marketing, May 2014, 5 pages.

J. Raymond Hodkinson, "Particle Sizing by Means of the Forward Scattering Lobe", Applied Optics, May 1966, vol. 5, No. 5, pp. 839-844.

CPS Instruments Europe, "Comparison of Particle Sizing Methods", The Netherlands, 14 pages.

Sami Siikanen et al., "In-line particle measurement in recovery boiler using high-speed infrared imaging", Proc. of SPIE, 2012, vol. 8354, pp. 83540M-1-83540M-6.

Spraytec, "Accurate particle sizing of aerosols and sprays", Malvern Instruments, Copyright 2007, MRK690-02, www.malvern.com, 8 pages.

"Chinese Search Report, CN Application No. 20158004797.0, dated Jan. 3, 2020", 3 pages.

"Simulation and Experiment on Sizing of Micrometer-Scale Particles Based on Mie's Light Scattering Theory", Chinese dissertation published on Jun. 15, 2006, 69 pages.

* cited by examiner

FIG. 2B

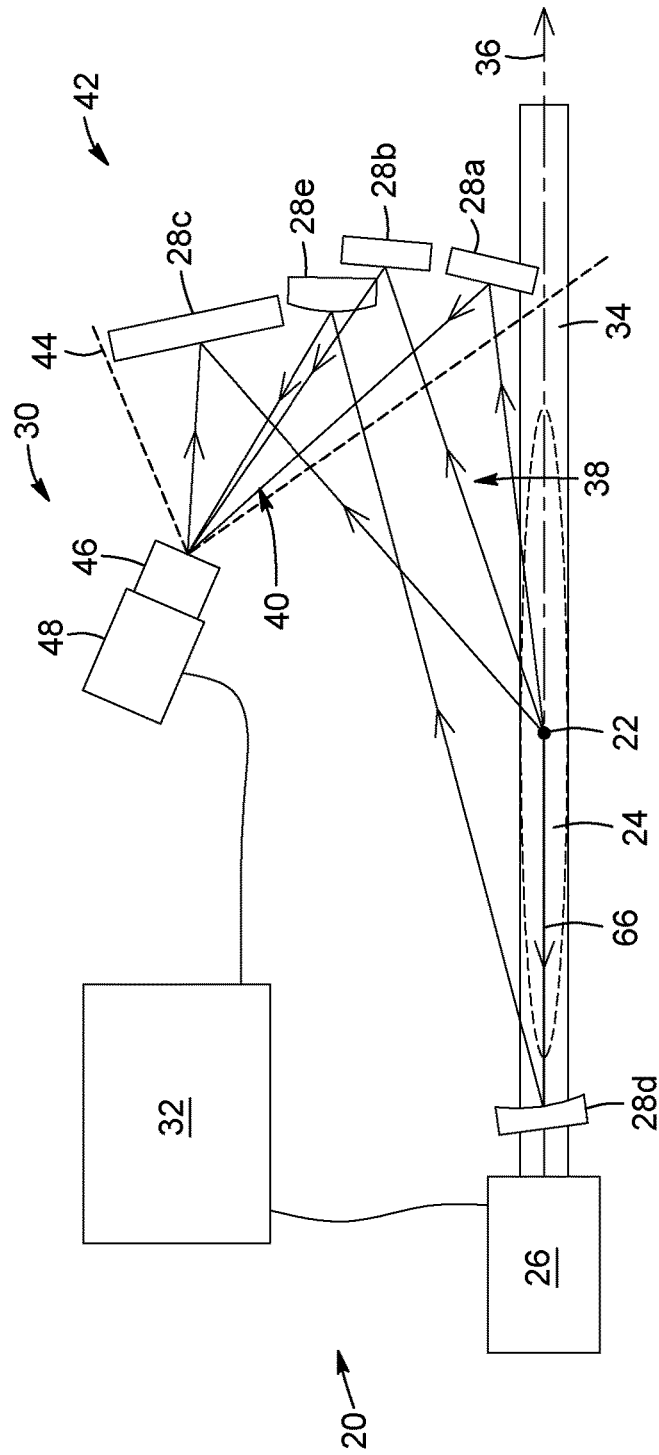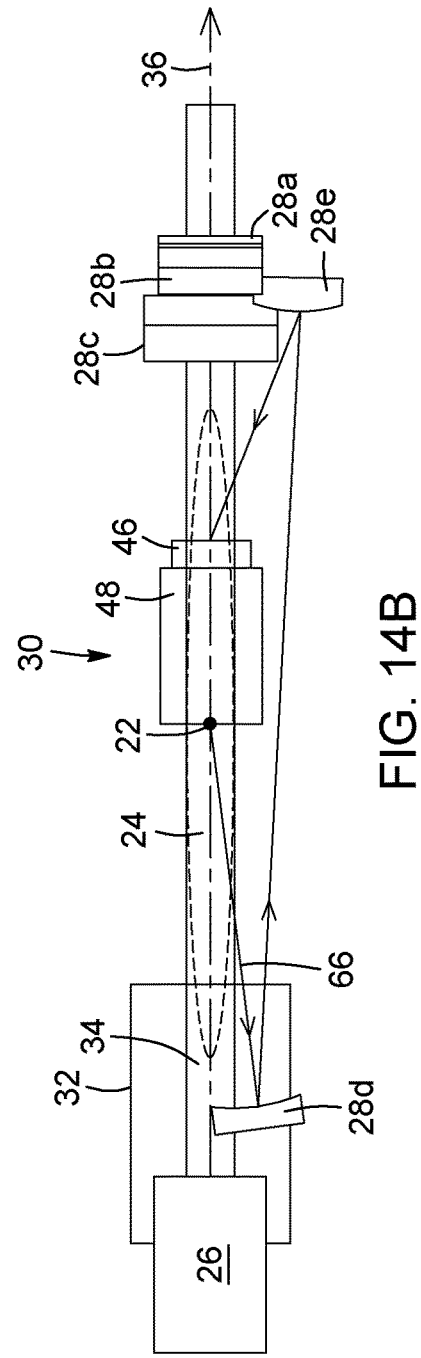

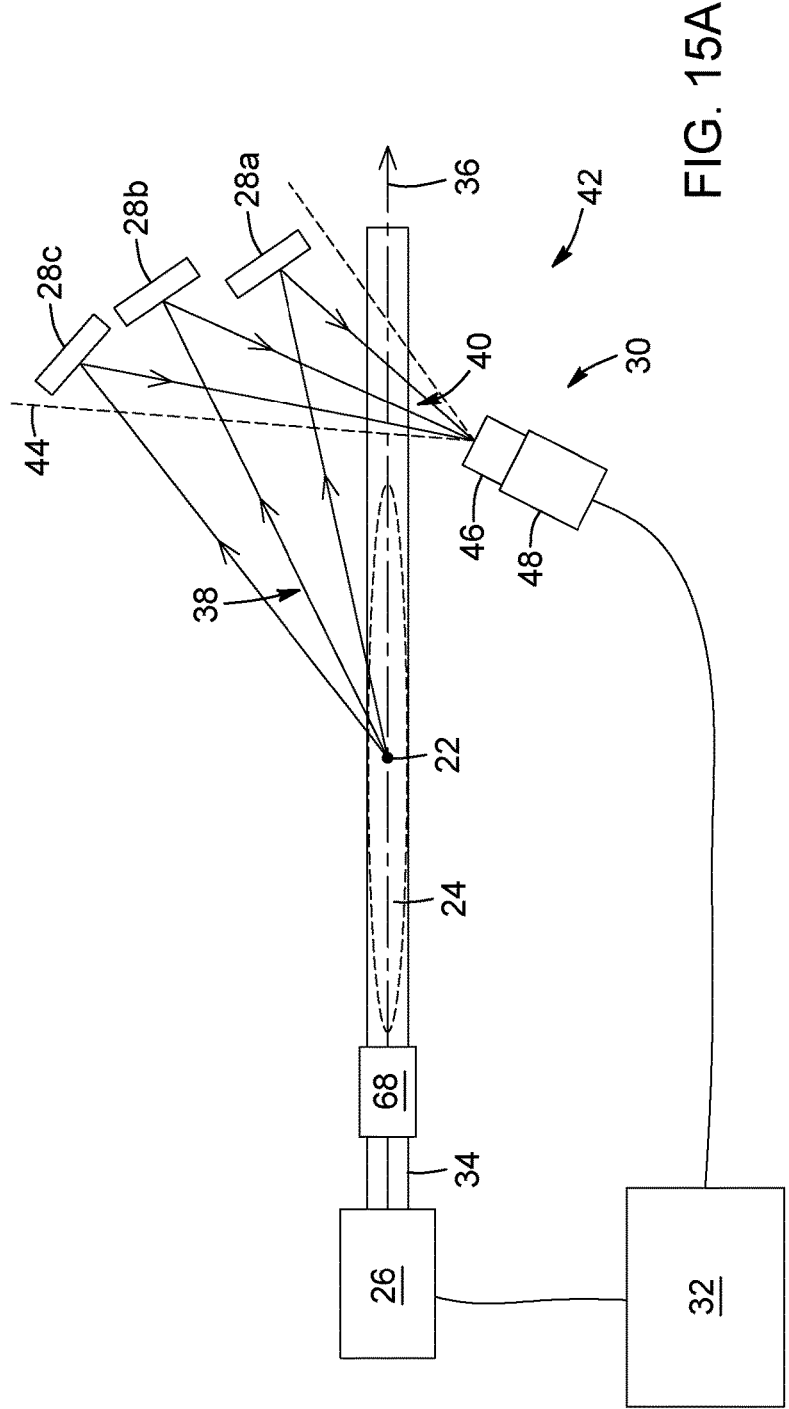
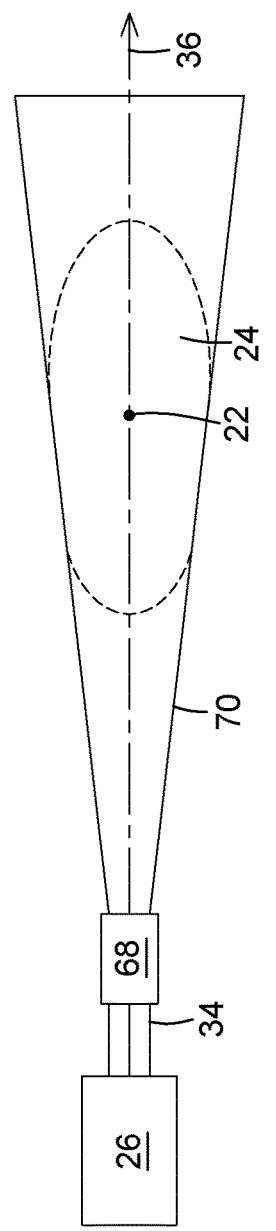
FIG. 15A
FIG. 15B

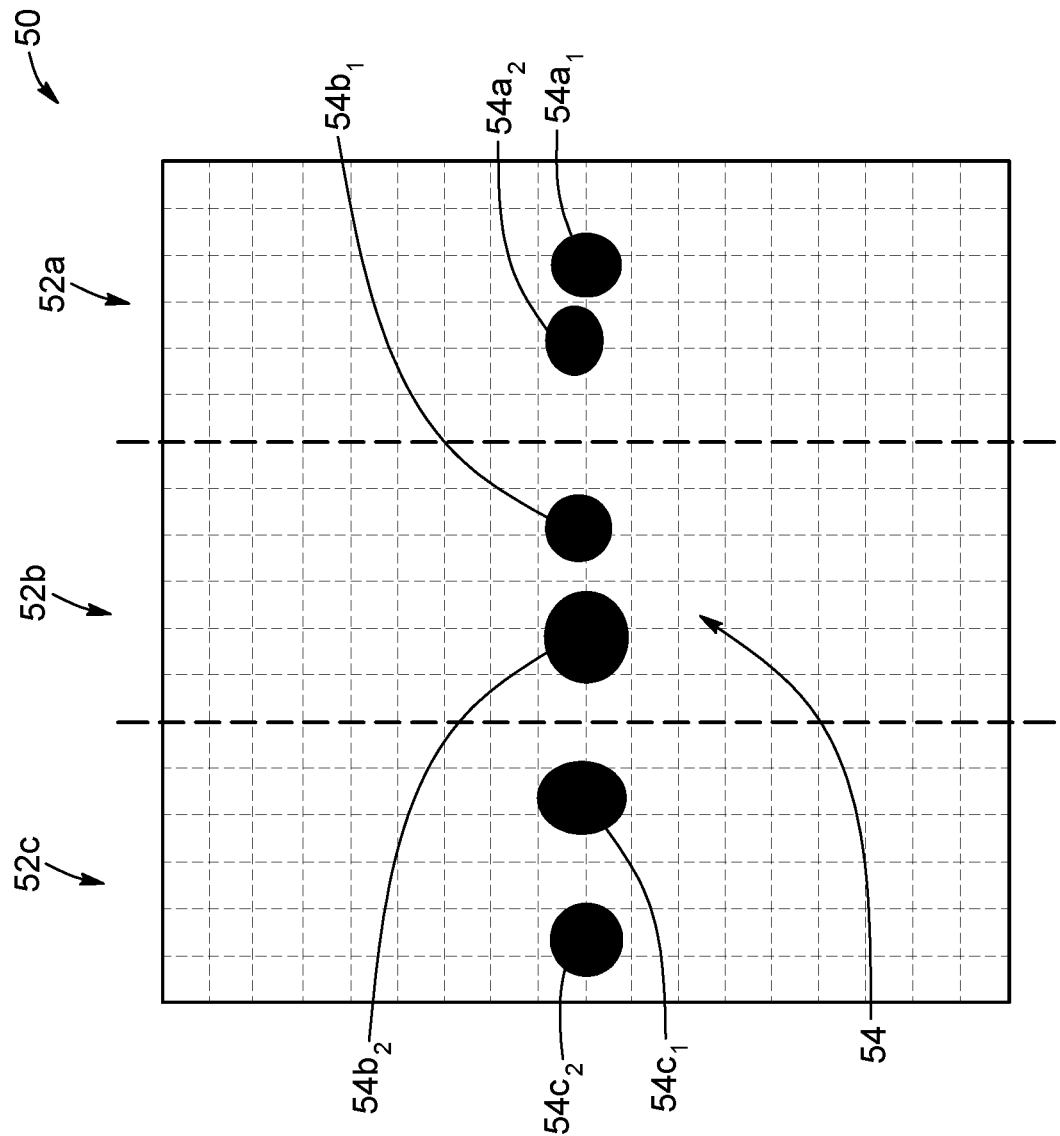

SYSTEM AND METHOD FOR INDIVIDUAL PARTICLE SIZING USING LIGHT SCATTERING TECHNIQUES

TECHNICAL FIELD

The general technical field relates to particle sizing techniques and, in particular, to a system and method for individual particle sizing using light scattering.

BACKGROUND

Airborne particulate matter (PM) is a growing concern worldwide and is known to have an adverse impact notably on human health, on the environment and on climate change. Many large cities around the world go through frequent and/or extended periods of time during which PM concentration levels exceed accepted thresholds. In 2014, the World Health Organization estimated that ambient air pollution contributes to 6.7% of all deaths worldwide. Studies have also established a link between air pollution and strokes from correlations with PM measurements performed in large cities, while other studies have associated air pollution with autism and learning disabilities in young children. Airborne PM can have different origins and chemical compositions, and can travel over long distances, so that regulations aimed at managing them are getting more stringent and complex. Recent trends and advances in environmental monitoring have also lead to new demands in terms of PM control and management.

Particle sizing techniques based on light scattering are known and have been used in different fields and with different types of materials. Such techniques generally involve providing a sample of particles, illuminating the sample, measuring light scattered by the particles, and analyzing the scattering measurements to obtain particle size information. Particle size distributions can also be obtained through statistical data accumulated over time on individual particles or by using inversion methods applied to a representative population of the sample.

Several commercially available systems use light scattering for determining the size of particles, typically using a laser diode for producing the light beam for particle illumination. The particles are usually supplied to a chamber by a vacuum-based pumping system that samples part of the ambient medium. The size of the chamber is typically small, with sidewalls of the order of a few millimeters (mm) long. The light beam usually provides a uniform illumination of the particles to reduce measurement errors arising from the fact that different scattered signals may originate from particles illuminated by different portions of the beam. An optical detector measures the amount of light scattered from the particles, usually at a scattering angle of about 90° relative to the propagation direction of the illumination light beam. Such a "sideway" scattering detection scheme may allow the particle sizing system to be made more compact and the amount of stray light reaching the detector to be reduced.

It is known that the particle sizing systems discussed above have some drawbacks and limitations. First, the intensity of light scattered at 90° is generally quite sensitive to the composition of the particles. As a result, proper calibration of the particle sizing system as a function of particle composition is generally unavoidable to ensure meaningful particle size measurements. In addition, the vacuum-based pumping systems typically used with conventional particle sizing systems are susceptible to mechanical wear and damage. As a result, these pumping systems generally require careful inspection and maintenance which, in turn, can substantially increase the operating costs of the particle sizing systems. Pumping systems also typically have to be calibrated to ensure that the supply rate of particles to the chamber is known, since its value will affect the number of particles analyzed per unit of time. Yet another limitation of conventional systems comes from the fact that particles are sampled from the ambient medium and supplied to the chamber by the pumping system. The sampling process can cause different measurement errors and biases due, for example, to inlets being biased to a certain particle size, to particles breaking up as a result of hitting system components, to particle deposition on wall surfaces, and the like.

Other types of particle sizing systems have been developed where forward rather than sideway scattered light is detected. In such systems, the intensity of the detected scattered signals may, in principle, be made less sensitive to particle composition. However, these systems generally rely on inversion methods such as mentioned above, which yield particle size distributions rather than individual particle sizes and often necessitate a model or a priori knowledge of the particle composition to be applied.

Accordingly, many challenges remain in the development of particle sizing systems and methods that use light scattering for determining the size of individual particles in a sample, while also being less sensitive to particle composition and involving less mechanical maintenance.

SUMMARY

In accordance with an aspect, there is provided a particle sizing system. The particle sizing system includes:
- an optical source generating a light beam, the light beam illuminating particles contained in a monitored volume;
- a plurality of light deflectors, each light deflector being positioned to receive and deflect light scattered by the illuminated particles;
- an image capture device collecting deflected scattered light from each light deflector, the image capture device outputting an image including a plurality of sub-images, each sub-image being generated from the collected light deflected from a respective one of the plurality of light deflectors, each illuminated particle being imaged as a spot in each of the plurality of sub-images, the plurality of spots associated with each illuminated particle corresponding to light scattered at a plurality of scattering angles; and
- a processing unit receiving the image from the image capture device, the processing unit being configured to, for each illuminated particle, identify the plurality of spots associated with the illuminated particle in the plurality of sub-images, determine a spot parameter associated with each of the plurality of spots, and determine a size of the illuminated particle from the plurality of spot parameters.

In accordance with another aspect, there is provided an imaging module for use in a particle sizing system. The imaging module includes:
- a plurality of light deflectors, each light deflector being positioned to receive and deflect light scattered by particles contained in a monitored volume and illuminated by a light beam; and
- an image capture device collecting deflected scattered light from each light deflector, the image capture device outputting an image including a plurality of sub-images, each sub-image being generated from the collected light deflected from a respective one of the plurality of light deflectors, each illuminated particle being imaged as a spot in each of the plurality of sub-images, the plurality of spots associated with each illuminated particle corresponding to light scattered at a plurality of scattering angles and being characterized by respective spot parameters, a combination of the plurality of spot parameters being indicative of a size of the illuminated particle associated therewith.

In accordance with another aspect, there is provided an imaging module as described herein, in combination with a computer readable memory storing computer executable instructions thereon that when executed by a computer perform the steps of:
receiving the image acquired by the image capture device; and, for each illuminated particle,
identify the plurality of spots associated with the illuminated particle in the plurality of sub-images, determine the spot parameter associated with each of the plurality of spots, and determine the size of the illuminated particle from the plurality of spot parameters.

In accordance with another aspect, there is provided a computer readable memory storing computer executable instructions thereon that when executed by a computer perform the steps of:
receiving an image from an imaging module for use in a particle sizing system, the imaging module including:
a plurality of light deflectors, each light deflector being positioned to receive and deflect light scattered by particles contained in a monitored volume and illuminated by a light beam; and
an image capture device collecting deflected scattered light from each light deflector, the image capture device outputting an image including a plurality of sub-images, each sub-image being generated from the collected light deflected from a respective one of the plurality of light deflectors, each illuminated particle being imaged as a spot in each of the plurality of sub-images, the plurality of spots associated with each illuminated particle corresponding to light scattered at a plurality of scattering angles and being characterized by respective spot parameters, a combination of the plurality of spot parameters being indicative of a size of the illuminated particle associated therewith; and, for each illuminated particle,
identify the plurality of spots associated with the illuminated particle in the plurality of sub-images, determine the spot parameter associated with each of the plurality of spots, and determine the size of the illuminated particle from the plurality of spot parameters.

In accordance with another aspect, there is provided a particle sizing method. The method includes the steps of:
illuminating particles contained in a monitored volume;
receiving and deflecting light scattered by the illuminated particles with a plurality of light deflectors;
collecting and imaging deflected scattered light from each light deflector with an image capture device;
outputting an image generated by the image capture device, the image including a plurality of sub-images, each sub-image being generated from the collected light deflected from a respective one of the plurality of light deflectors, each illuminated particle being imaged as a spot in each of the plurality of sub-images, the plurality of spots associated with each illuminated particle corresponding to light scattered at a plurality of scattering angles; and, for each illuminated particle,
identifying the plurality of spots associated with the illuminated particle in the plurality of sub-images, determining a spot parameter associated with each of the plurality of spots, and determining a size of the illuminated particle from the plurality of spot parameters.

Other features and advantages of the embodiments of the present invention will be better understood upon reading of preferred embodiments thereof with reference to the appended drawings.

BRIEF DESCRIPTION OF THE DRAWINGS

In FIG. 1C, each point represents an average over a scattering angle range of 1°.

FIGS. 2A and 2B are ratios of scattering cross sections calculated for various pairs of scattering angles (1.5° and 5°: solid line; 1.5° and 25°: short-dashed line; and 5° and 25°: long-dashed line) plotted as a function of the diameter of dust-like particles at a wavelength of 532 nm. The angular coverage is 0.1° in FIG. 2A and 0.3° in FIG. 2B.

FIG. 4A: 0.7 micrometers (µm); FIG. 4B: 1.5 µm; FIG. 4C: 5 µm; and FIG. 4D: 10 µm.

FIGS. 14A and 14B are respectively schematic top and side views of a particle sizing system, in accordance with another embodiment.

FIGS. 15A and 15B are respectively schematic top and side views of a particle sizing system, in accordance with another embodiment, wherein the light beam illuminating the particles in the monitored volume is a fan-shaped beam.

FIG. 16 is a schematic representation of an image acquired by the particle sizing system of FIG. 5.

DETAILED DESCRIPTION

Figure 1A:
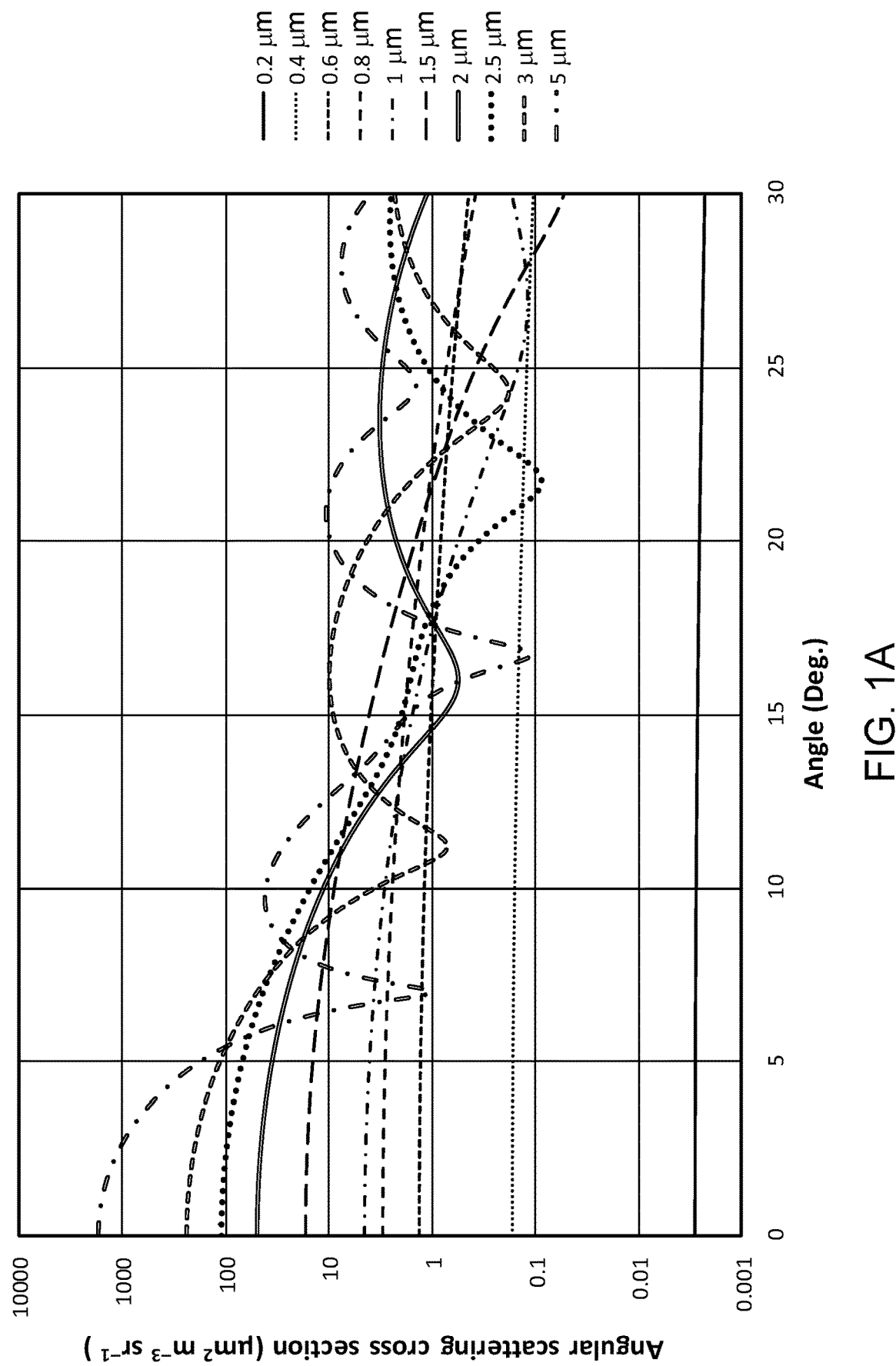
FIGS. 1A to 1C are numerically calculated scattering cross section curves plotted as a function of scattering angle for dust-like particles of various diameters when illuminated with light at a wavelength of 532 nanometers (nm).

In the following description, similar features in the drawings have been given similar reference numerals, and, in order to not unduly encumber the figures, some elements may not be indicated on some figures if they were already identified in preceding figures. It should also be understood herein that the elements of the drawings are not necessarily depicted to scale, since emphasis is placed upon clearly illustrating the elements and structures of the present embodiments.

General Overview—Particle Sizing Using Light Scattering Techniques

The present description generally relates to techniques for determining the size of individual particles contained in a monitored volume. In accordance with different aspects, there are provided a particle sizing system, an imaging module for use in a particle sizing system, and a particle sizing method. The present techniques generally use light scattering to determine, in situ, information about the size of individual particles, but also, in some embodiments, about one or more other particle characteristics including, without limitation, position within the volume, shape, composition, phase and optical absorption. In some implementations, the present techniques can also be used to determine the particle size distribution of a collection of particles in a fluid medium from individual particle sizes measured over time or across a large monitored volume.

The techniques described herein may be particularly useful in any application where it is desired to determine the size of individual particles contained in a host medium. By way of example, the present techniques may be used in air quality monitoring to determine the particle size distributions and, in particular, the PM2.5 (PM up to 2.5 μm size) and PM10 (PM up to 10 μm size) contents of airborne PM. The present techniques may also be used for emission monitoring of processes generating various types of aerosols such as, for example, power plants. Other applications may include tailings pond monitoring and real-time control of the size distribution of water droplets from water sprayers used to reduce dust released from mining operations (e.g., coal mining). The present techniques may further be used in process monitoring and control of pharmaceutical drug production where the size of the particulate drugs can affect the efficiency of the drug delivery process. Yet another possible application includes quality assessment of transparent solid materials (e.g., glass) to detect and determine the size of bulk and/or surface defects that can scatter light.

As used herein, the term "particle" and any variant thereof refer broadly to any individual mass, structure or refractive index non-uniformity, or any collection thereof, that is capable of scattering light incident thereonto. It will be understood that, in principle, the term "particle" is not meant to be restricted with respect to size, shape or composition. For example, some embodiments may be suited for sizing substantially spherical particles having a diameter ranging from about 0.1 μm to 100 μm and, in particular, from about 0.2 μm to 40 μm, although other shapes and sizes may be contemplated in other embodiments. Both the particles and the host medium in which the particles are suspended, dispersed, contained or otherwise located may be gaseous, liquid or solid, as long as the particles and the host medium have different refractive indices. The host medium may be transparent or semi-transparent. By way of example, in some embodiments, the particle may be solid particles suspended in a gas or a liquid medium. Unless otherwise specified, the term "particle size" and any variant thereof refer herein to the diameter of a particle.

As used herein, the term "scattering" and any variant thereof refer in a broad sense to the dispersal of light by one or more particles as a result of physical interactions therewith. The mechanisms involved may include, but are not limited to, reflection, refraction, absorption and diffraction, as well as fluorescent, phosphorescent or luminescent phenomena. Depending on the particular physical process at play, the scattering may be accompanied or not by a wavelength shift of the scattered light with respect to the light illuminating the particles.

As used herein, the terms "light", "optical" and any variant thereof are intended to refer to electromagnetic radiation in any appropriate region of the electromagnetic spectrum and, in particular, are not limited to visible light but may also include the terahertz, infrared and ultraviolet ranges. By way of example, in some embodiments, the terms "light" and "optical" may encompass electromagnetic radiation with a wavelength ranging from about 350 nm to 1000 nm.

It is known in the art that light scattering may be classified as "forward scattering", "backward scattering", and "sideway scattering". The terms "forward scattering", "backward scattering" and "sideway scattering" refer to light scattered in a direction making an angle respectively smaller than, greater than and close to 90° with the propagation direction of the incident beam. As will be discussed further below, in some implementations, the particle sizing techniques described herein may use forward scattering at small angles in order to eliminate or at least reduce the dependence of the particle size determination on the refractive index (and thus on the composition) of the particle.

Figure 1B:
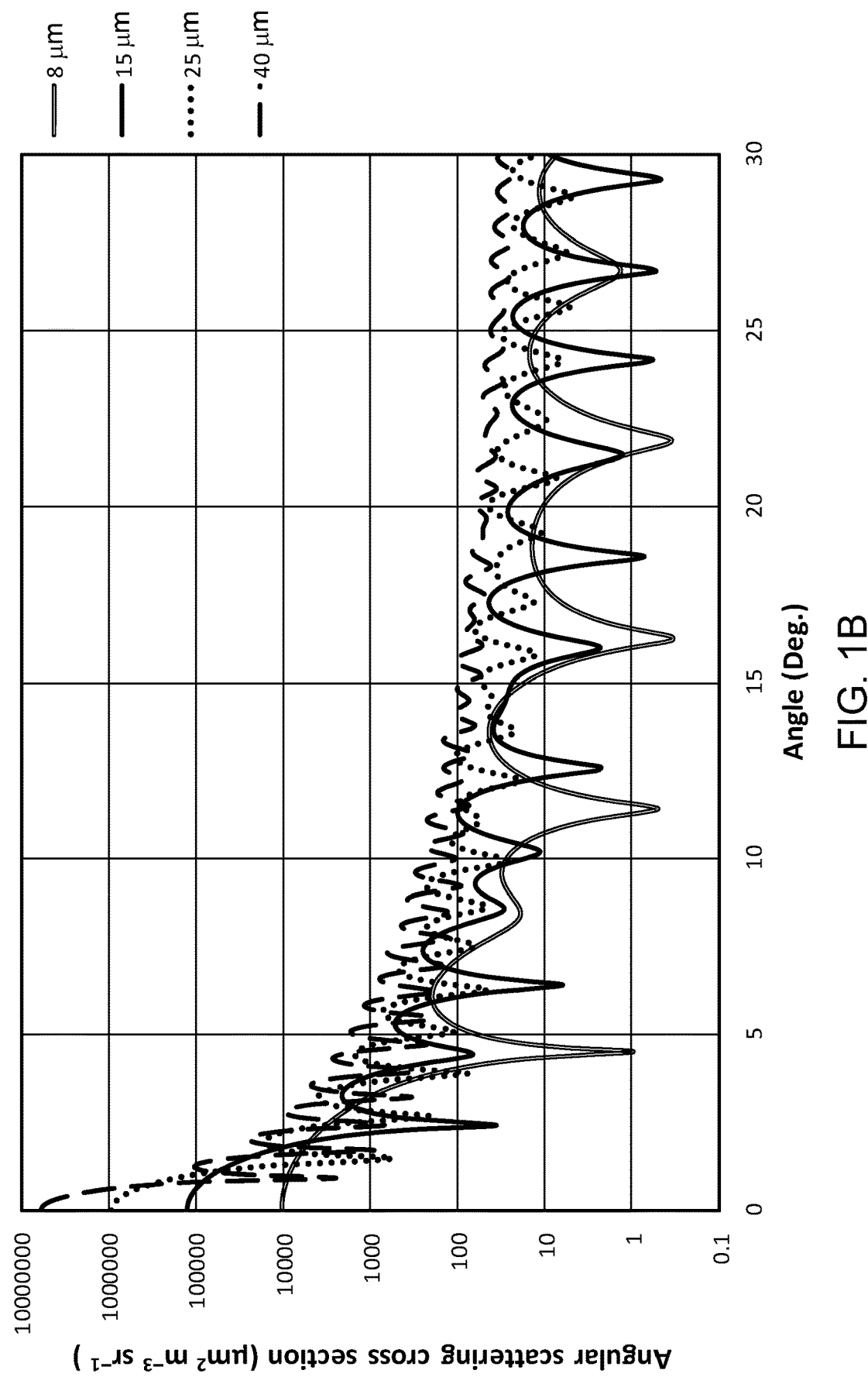

Referring to FIGS. 1A and 1B, it is known that for small scattering angles, the forward scattering cross section at a given wavelength generally decreases monotonically with the scattering angle. As used herein, the term "small scattering angle" refers generally to scattering angles which, when expressed in radians, are smaller than the ratio of the light wavelength to the particle diameter. It is also known that the lowest scattering angle at which the value of the angular scattering cross section gets equal to half its maximum value at zero degree varies inversely with the particle diameter. These characteristics can make it possible to achieve, in principle, particle sizing from the main forward scattering lobe of a single particle, as described for example in J. Raymond Hodkinson, "*Particle Sizing by Means of the Forward Scattering Lobe*", Applied Optics vol. 5, issue 5, pp. 839-844 (1966).

By way of example, in some embodiments of the present techniques, the size of a particle may be determined by collecting forward scattered light at different scattering angles, and then using reference data obtained from the Mie theory or from another appropriate light scattering theory to determine the particle size that better matches measurement data at the chosen light wavelength. As known in the art, the Mie scattering theory provides a complete angular distribution of scattered light intensity from an isotropic and homogenous spherical particle as a function of its size, refractive index and wavelength of the incident light.

According to the techniques described herein, the amount of light scattered by a particle is measured at two or more scattering angles. In some implementations, one or more ratios may be obtained between the two or more measured scattered signals. The one or more ratios may then be compared with reference data, for example theoretical ratios calculated from the Mie theory, to determine the size of the particle.

Figure 1C:
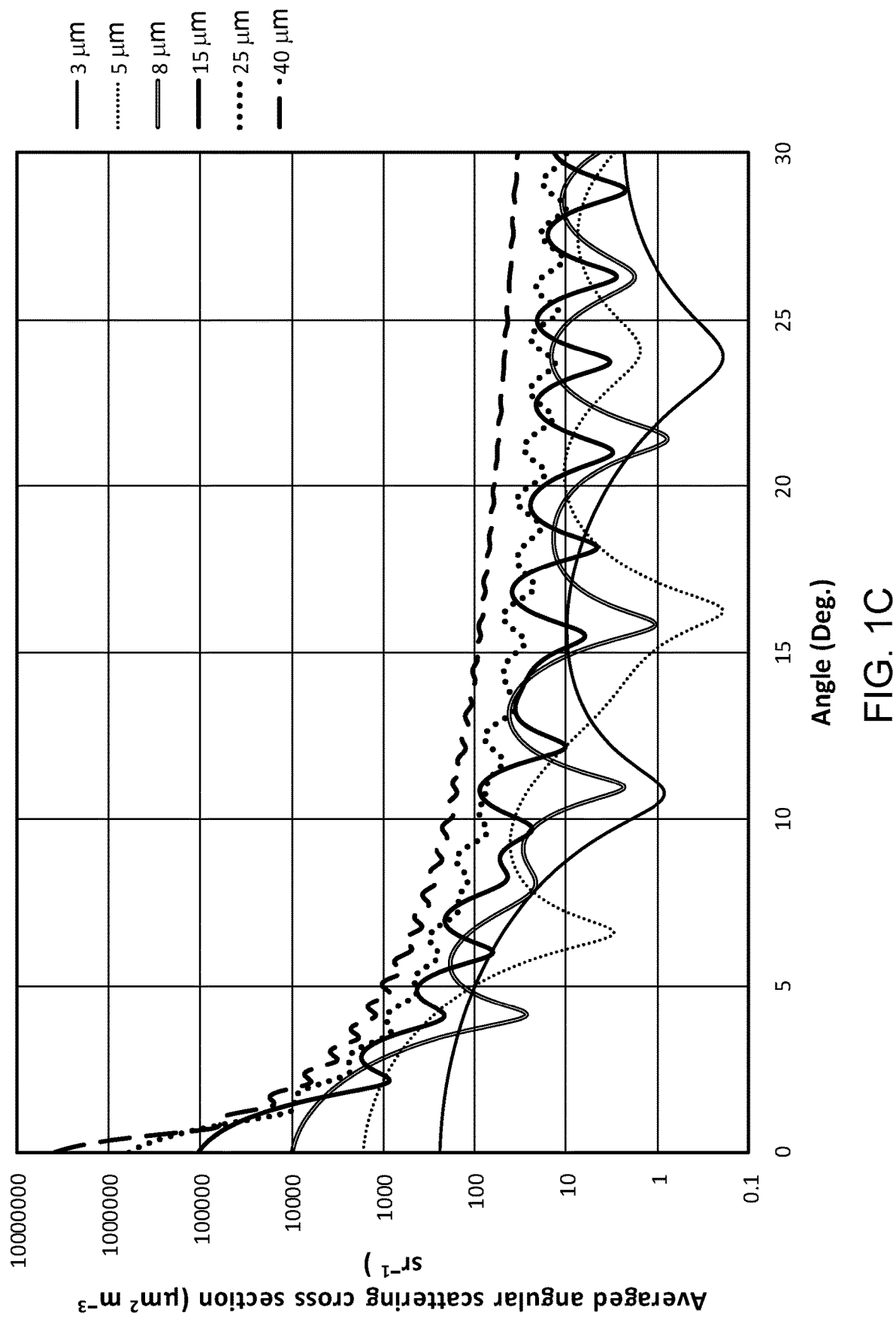

It will be understood that implementing such an approach may involve a careful selection of the different scattering angles at which the scattered signals are to be measured at a given wavelength. By way of example, as seen in FIGS. 1A and 1B, for particles having a diameter ranging from about 0.2 µm to 8 µm, the angular scattering cross section has a monotonic behavior for scattering angles lower than about 5°. However, for particles larger than 8 µm, it is seen that the angular scattering cross section oscillates as a function of scattering angle even at small scattering angles. These oscillations are caused by angle-dependent interference between waves scattered by different portions of the particle. As seen in FIG. 1C, the amplitude of these oscillations tends to be reduced by averaging each point of the curves over a scattering angle range (or angular coverage) of 1°. It is to be noted that most particles released from industrial plants are generally not perfectly spherical. In some implementations, the non-spherical character of the particles may have an averaging effect that can attenuate the oscillations of the angular scattering cross section.

Figure 2A:
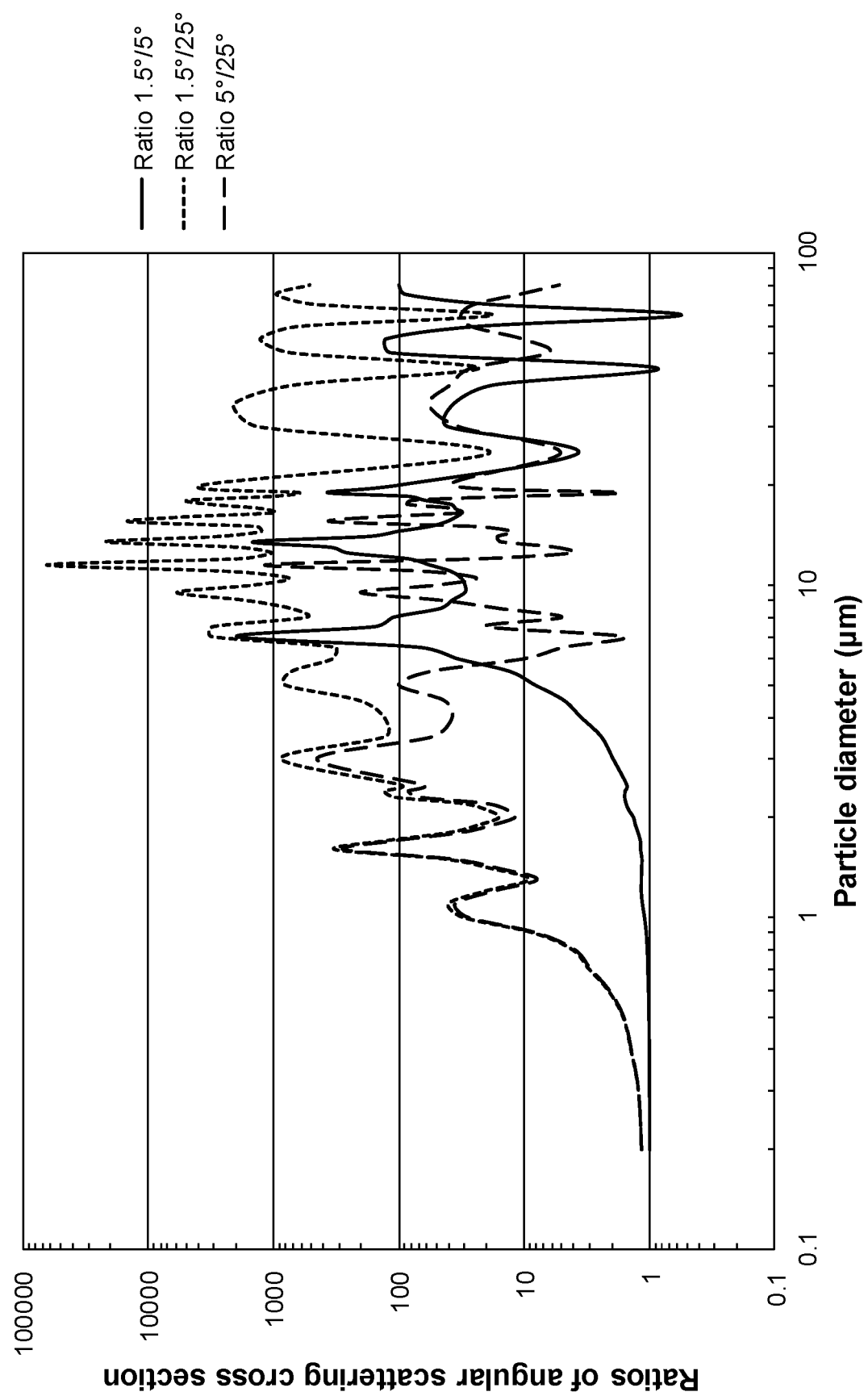
Figure 2B:
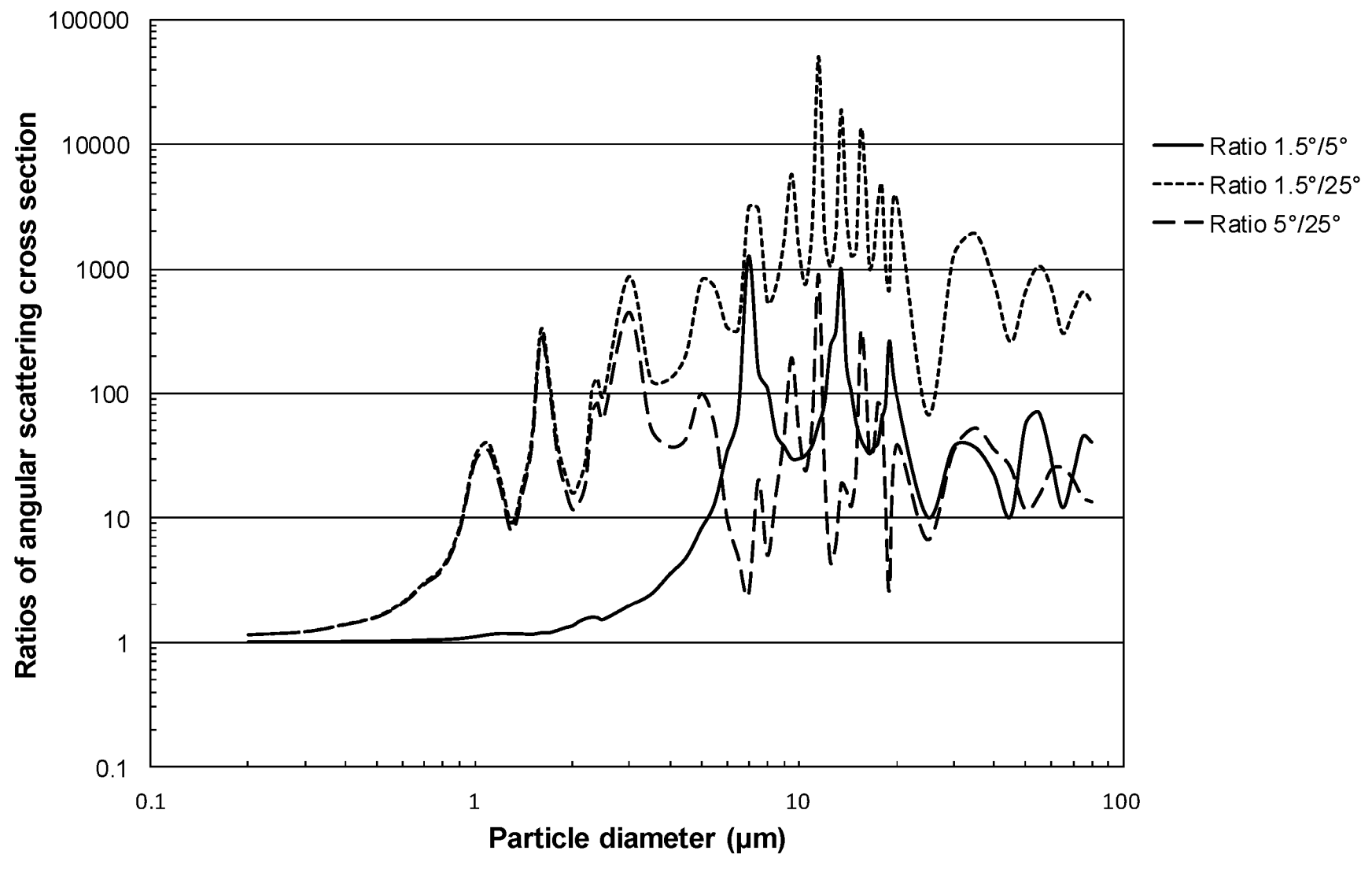

Turning to FIGS. 2A and 2B, there are illustrated curves of the ratio of scattering cross sections calculated for various pairs of scattering angles, namely 1.5° and 5° (solid line), 1.5° and 25° (short-dashed line) and 5° and 25° (long-dashed line). Each ratio is plotted as a function of the diameter of dust-like particles illuminated with light at a wavelength of 532 nm. The angular coverage is 0.1° in FIG. 2A and 0.3° in FIG. 2B. The larger angular coverage in FIG. 2B aims to simulate the presence of an aperture in the optics used to collect the scattered light.

As seen in FIGS. 2A and 2B, the ratio between the scattered intensities at 1.5° and 5° (solid line) increases monotonically for diameters up to about 7 µm, which makes it possible, in principle, to determine the size of particles smaller than 7 µm solely from this ratio. However, the presence of oscillations for diameters larger than 7 µm may prevent or at least make it more difficult to properly determine particle size in this range. Furthermore, since the ratio is nearly constant for diameters between 0.1 and 1 µm, particles in this range may not be readily discriminated from this ratio alone, but could be if one or both of the ratios between the scattered intensities at 1.5° and 25° (short-dashed line) and the scattered intensities at 5° and 25° (long-dashed line) are considered in the analysis.

FIG. 2A also shows that for particles larger than 7 µm, some diameter ranges would exhibit similar combinations of values for the three ratios, thus preventing or at least making it difficult for particle sizes to be determined with sufficient accuracy. In such a case, it is seen from FIG. 2B that the aperture of the collecting optics can provide an averaging effect that tends to attenuate the oscillations in the ratios as a function of diameter and that may alleviate at least some of the ambiguities observed in FIG. 2A. In particular, it is seen that the oscillations in the ratios are more strongly attenuated for larger particles (i.e., over about 20 µm), thus reducing the range of particle diameters for which similar ratio values are observed and, in turn, improving the size discrimination capabilities.

Figure 3:
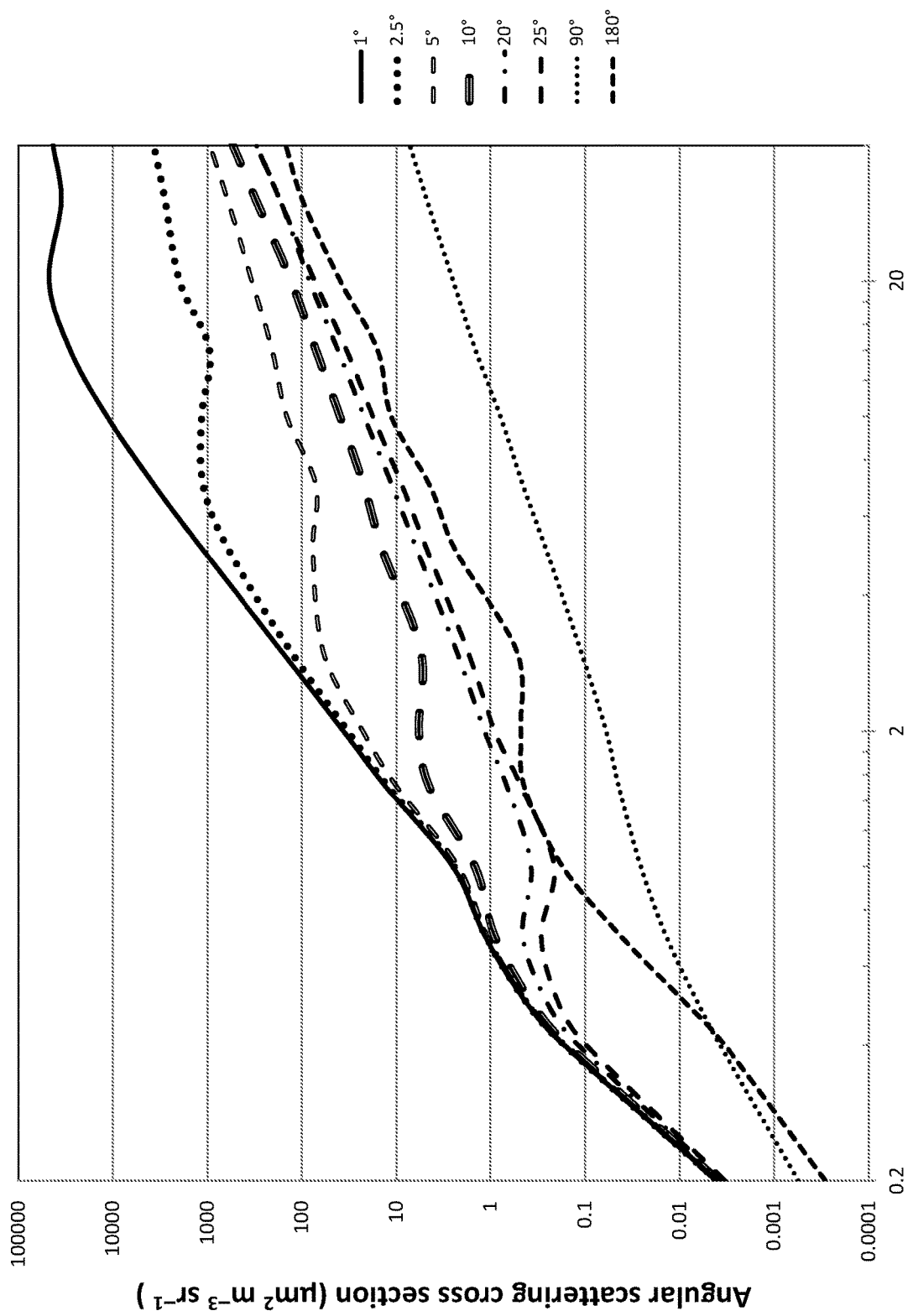
FIG. 3 shows a numerically calculated scattering cross section curves plotted as a function of particle diameter for spherical quartz particles at a wavelength of 532 nm. Each curve corresponds to a different scattering angle, ranging from 1° to 180°.

Referring now to FIG. 3, there are illustrated calculated curves of the angular scattering cross section of spherical quartz particles plotted as a function of particle diameter at a wavelength of 532 nm, each curve corresponding to a different scattering angle between 1° and 180°. It is seen that for small scattering angles (i.e., below 5°), the angular scattering cross section varies by up to three orders of magnitude when the particle diameter increases from 0.2 to 1 µm, by two to three orders of magnitude between 1 et 10 µm, and by one order of magnitude or less between 10 and 40 µm, for a total of six to seven orders of magnitude between 0.2 and 40 µm. Therefore, in some implementations, the strength of the measured scattered signals at small forward scattering angles may provide an estimate of the order of magnitude of the particle size. In other words, absolute values of the measured scattered intensities may be used to get a coarse estimate of the particle size. Combining the results obtained from this pre-classification with information gathered from ratios of scattered intensities at one or more pairs of scattering angles may allow particle size to be determined with enhanced accuracy when measurement data is compared with reference data.

FIG. 3 also illustrates the benefit, in some implementations, of carefully selecting the different observation angles to allow the size of small particles to be determined with sufficient accuracy. By way of example, almost no signal differences would be perceived between different observation angles in the range from 1° to 10° in the case of particles having diameters from about 0.2 to 0.6 µm.

A further aspect that may affect the validity of particle sizing is the dependence on particle composition or, equivalently, the particle refractive index. Referring to FIGS. 4A to 4D, there are illustrated calculated curves of the angular scattering cross section plotted as a function of scattering angle for three different particle compositions (carbonaceous, quartz and dust-like aerosol particles) at a wavelength of 905 nm, each of FIGS. 4A to 4D corresponding to a different particle size (diameter of 0.7 µm, 1.5 µm, 5 µm and 10 µm, respectively). The curves depicted in FIGS. 4A to 4D have been calculated assuming a single-mode log-normal distribution of particles to avoid or at least attenuate the effect of oscillations at large scattering angles.

Figure 4A:
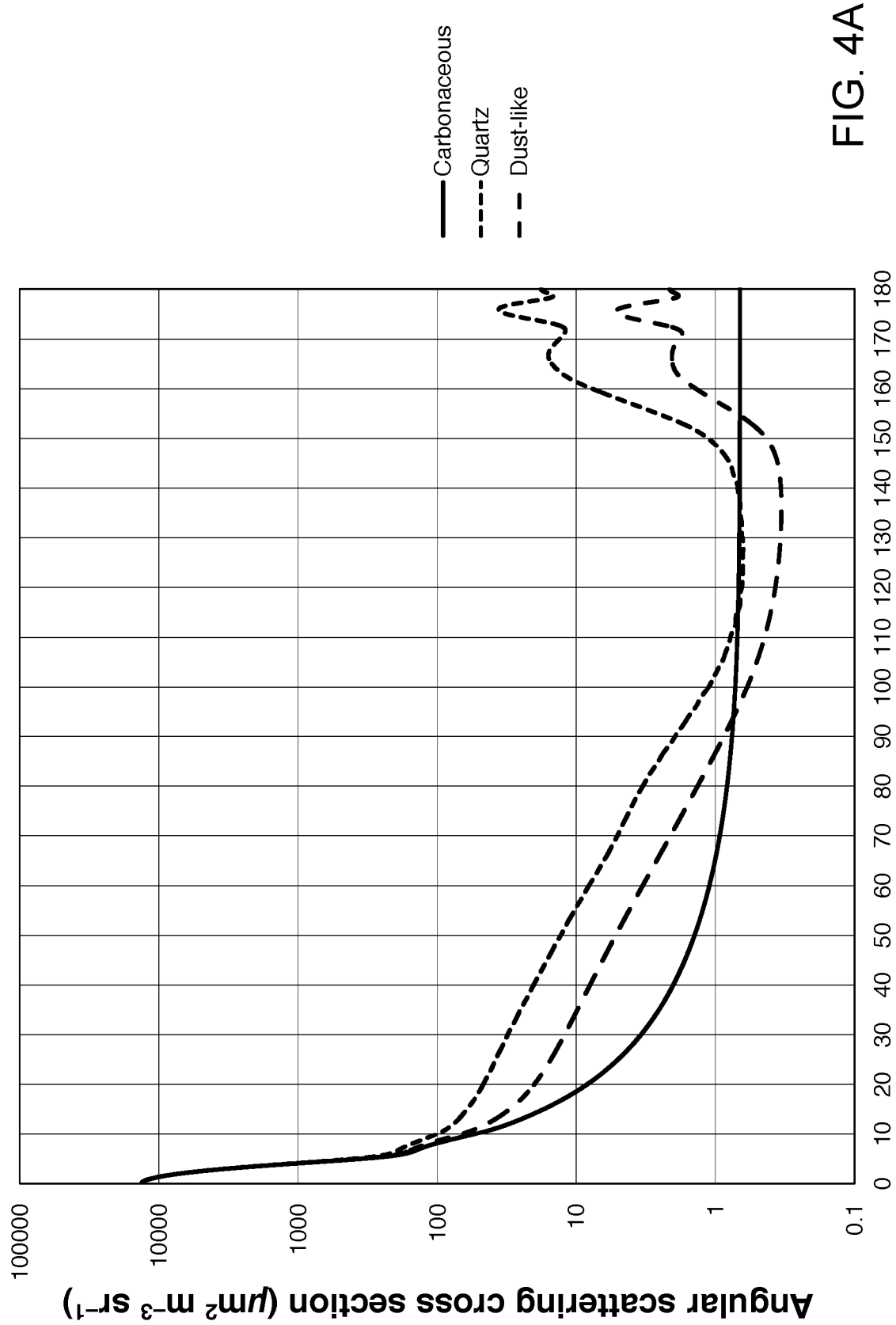
FIGS. 4A to 4D show numerically calculated scattering cross section curves plotted as a function of scattering angle for three different particle compositions (carbonaceous, quartz and dust-like aerosol particles) at a wavelength of 905 nm. Each of FIGS. 4A to 4D corresponds to a different particle diameter, namely

As seen in FIG. 4A, the angular scattering cross section of smaller particles (i.e., smaller than the light wavelength) can depend non-negligibly on particle composition in the whole range of scattering angles between 0° and 180°. More specifically, it is seen that for smaller particles, strongly absorbing particles scatter light less strongly than weakly absorbing ones. However, the relative angular behavior generally does not depend significantly on particle composition for the main diffraction lobe (i.e. below 90°). Therefore, using both absolute and relative values of measured scattered signals to determine particle size may be useful for smaller particles whose composition is not known a priori.

Figure 4B:
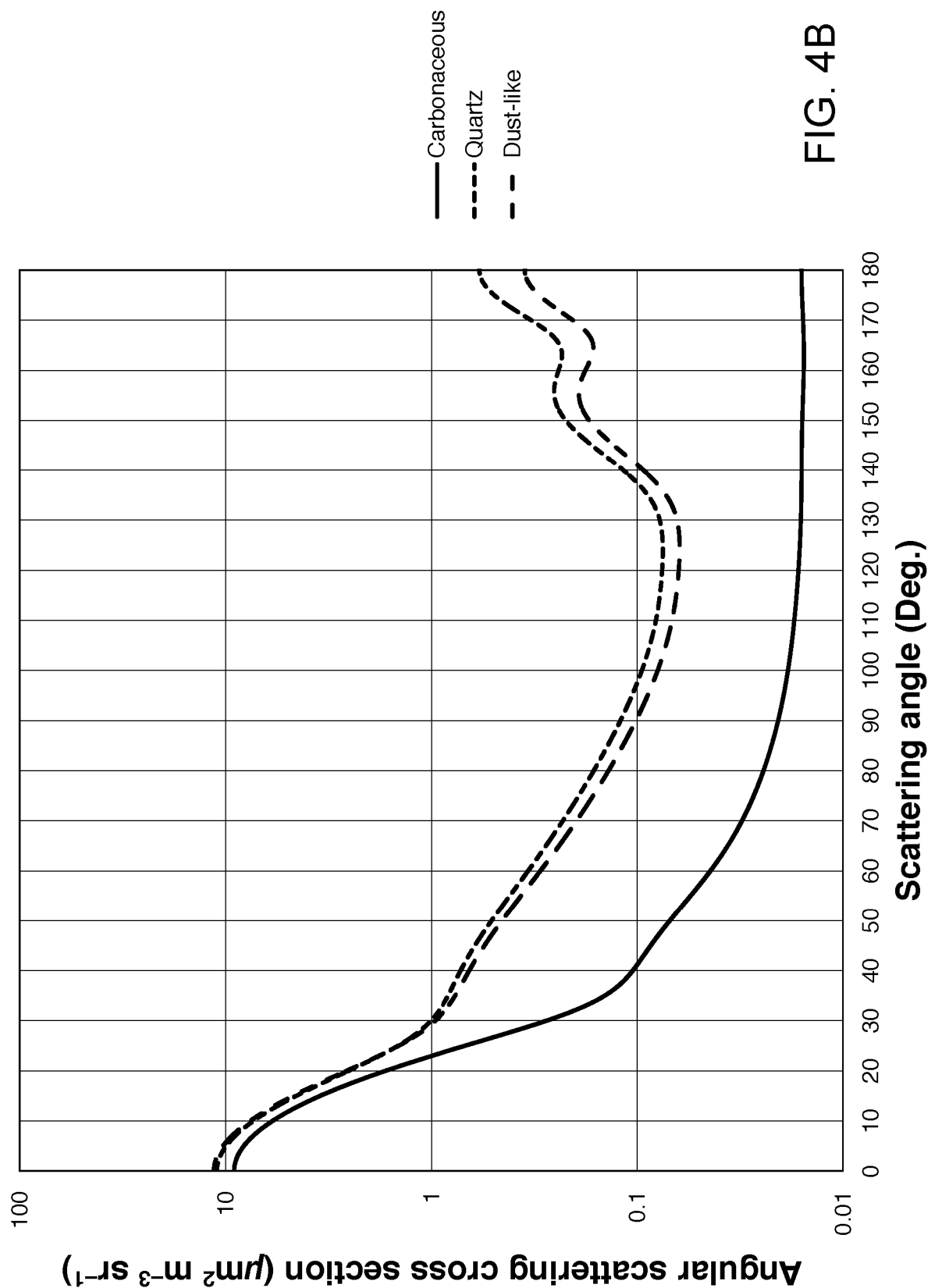
Figure 4C:
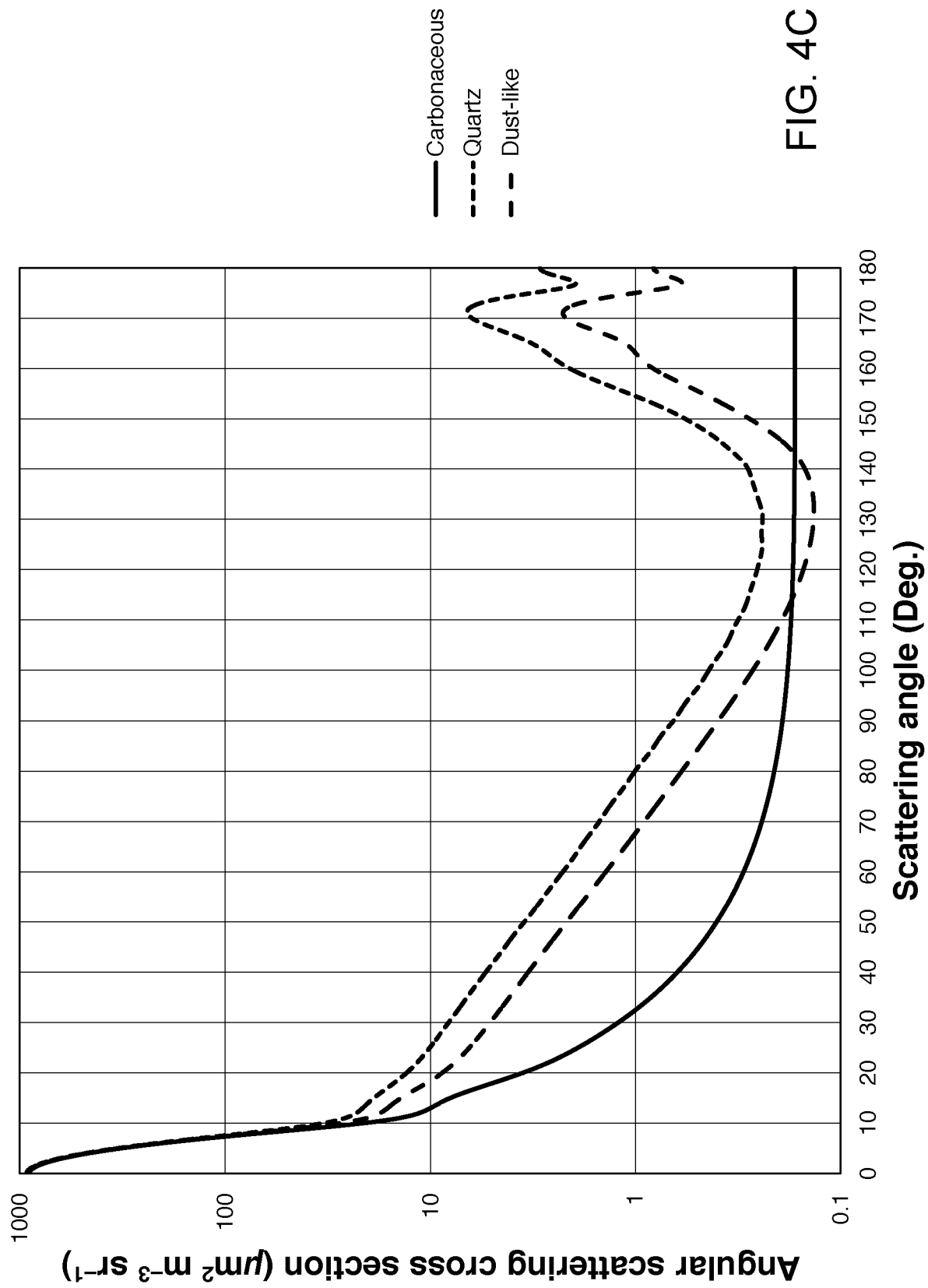
Figure 4D:
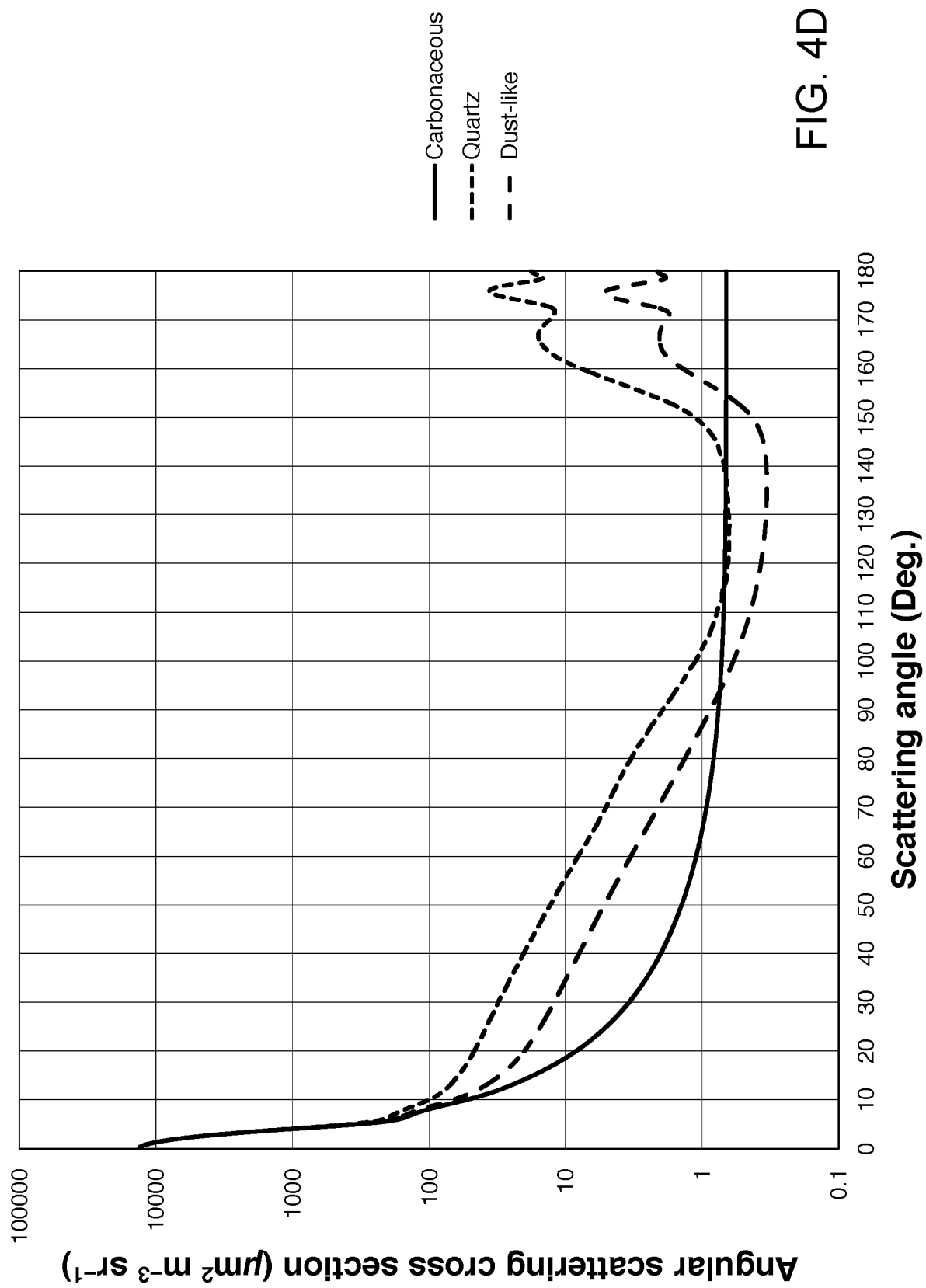

Meanwhile, FIGS. 4B to 4D indicate that the angular scattering cross section of larger particles (i.e., those larger than the light wavelength) remains largely independent of particle composition at small forward scattering angles (i.e., between about 1° and 5°). Accordingly, in some implementations, relations (e.g., ratios) between forward scattered signals measured at small scattering angles may be used to determine or at least estimate the size of individual particles without requiring prior knowledge of their composition. By contrast, FIGS. 4A to 4D also illustrate that particle composition may have a significant effect on the capability of determining particle size as the scattering angle increases. This can explain, at least partly, why existing particle sizing systems based on sideway scattering measurements generally need to be calibrated as a function of particle composition.

Particle Sizing System

Referring generally to FIGS. 5 to 15B, various exemplary embodiments of a particle sizing system 20 for determining the size of particles 22 present in a monitored volume 24 are illustrated. The particles are hereinafter referred to generally and collectively as 22, but individually as $22_1$ and $22_2$. Broadly described, and as discussed in greater detail below, the particle sizing system 20 generally includes four main components, namely an optical source 26, a plurality of light deflectors 28a to 28c, an image capture device 30, and a processing unit 32.

The optical source 26 generates a light beam 34 that then propagates along an optical axis 36, the light beam 34 illuminating particles 22 contained in the monitored volume 24. As used herein, the term "monitored volume" refers to a region of space containing particles illuminated by the light beam and defined such that light scattered from each illuminated particle in the region of space is collected at a plurality of distinct scattering angles after deflection from the plurality of light deflectors. In other words, the monitored volume represents the portion of the light beam that can be imaged by the image capture device via each one of the plurality of light deflectors. Accordingly, it will be understood that the monitored volume is defined not only by the cross-sectional area of the light beam, but also by the position of each light deflector in the field of view of the image capture device. In this regard, it is noted that the term "position" and any derivative thereof refer herein to the full positional information of an object in space, including both location and orientation coordinates.

It is noted that, in some cases, particle size information may be obtained for illuminated particles that are located outside of the "monitored volume" as defined herein, but whose part of scattered light is collected by the image capture device via at least one of the plurality of light deflectors. By way of example, in an implementation where particle size can be determined from ratios of scattered intensities at pairs of scattering angles, the size of a given particle may be determined solely from scattered light collected by the image capture device via two light deflectors, even if the particle sizing system includes more than two such light deflectors.

Generally, the illuminated particles 22 in the monitored volume 24 cause the light beam 34 to be scattered, in all directions. Each light deflector 28a to 28c is positioned to receive and deflect scattered light 38 in a certain scattering angle range from each illuminated particle 22 in the monitored volume 24. As mentioned above, in some embodiments, the light deflectors 28a to 28c may be configured to deflect forward scattered light onto the image capture device 30. More specifically, in such embodiments, each light deflector 28a to 28c may be positioned such as to deflect a respective forward scattered component of the light 38 scattered from each particle 22 present in the monitored volume 24. In other words, for each particle 22, the scattering angle range covered by each light deflector 28a to 28c is limited to scattering angles that are smaller than 90° relative to the propagation direction of the light beam 34 along the optical axis 36. By way of example, in some embodiments, the forward scattered component deflected by each light deflector 28a to 28c represents light 38 scattered at an angle smaller than 35° with respect to the propagation direction of the light beam 34.

The image capture device 30 collects deflected scattered light 40 within its field of view from each one of the plurality of light deflectors 28a to 28c. For this purpose, the image capture device 30 can include collecting optics 46 adapted to collect deflected scattered light 40 from the plurality of light deflectors 28a to 28c. The image capture device 30 also outputs an image including a plurality of sub-images, where each sub-image is generated from the collected light deflected from a respective one of the plurality of light deflectors 28a to 28c. Each illuminated particle 22 is imaged as a spot in each sub-image, such that the plurality of spots associated with a given particle 22 corresponds to light scattered by this particle 22 at a plurality of different scattering angles.

The processing unit 32 then receives the image from the image capture device 30. As used herein, the term "processing unit" denotes an entity of the particle sizing system that controls and executes, at least partially, the functions required to operate the particle sizing system including, without being limited to, determining particle size from the image acquired by the image capture device. The processing unit 32 may be implemented as a single unit or as a plurality of interconnected processing sub-units. Also, the processing unit 32 may be embodied by a computer, a microprocessor, a microcontroller, a central processing unit (CPU), or by any other type of processing resource or any combination of such processing resources configured to operate collectively as a processing unit. The processing unit 32 may be provided within one or more general purpose computers and/or within any other suitable computing devices. Also, the processing unit 32 can be implemented in hardware, software, firmware, or any combination thereof, and be connected to the various components of the particle sizing system 20 via appropriate communication ports.

For each illuminated particle 22, the processing unit 32 is first configured to identify the plurality of spots associated with the particle 22 in the plurality of sub-images. It will be appreciated that with proper knowledge or calibration of the relative positions of the light beam 34, the light deflectors 28a to 28c and the image capture device 30, it may be possible to associate a location in the monitored volume 24 with each spot visible in each sub-image. In other words, it is possible to determine where the light scattered by each illuminated particle 22 at a particular location in the monitored volume 24 will form a spot in each of the sub-images after deflection from the corresponding one of the light deflectors 28a to 28c.

The processing unit 32 is also configured to determine a spot parameter associated with each of the plurality of spots, and to determine a size of the illuminated particle 22 from the plurality of spot parameters. In some implementations, each spot parameter may be an energy parameter indicative of an amount of optical energy contained in the spot associated therewith. In other implementations, the spot parameters may correspond, without limitation, to a size, a shape, a polarization or a spectral content of the spots, or any combination thereof. When the spot parameters are energy parameters, the processing unit 32 may be configured to calculate or otherwise obtain one or more ratios between the energy parameters associated with each illuminated particle 22. In such a case, the size of each illuminated particle 22 may be determined from a comparison of the one or more ratios with reference data. By way of example, the reference data can be obtained from a numerical or analytical model based on the Mie scattering theory or on another suitable theoretical framework (e.g., the Rayleigh or Fraunhofer scattering theories) allowing a reference scattering response of the particles to be obtained. In particular, the manner of obtaining the reference data is not meant to limit the scope of application of the techniques described herein.

It is worth mentioning that the techniques described herein may employ relative signals (e.g., signal ratios) rather than absolute signals. In some embodiments, the use of relative signals can make the particle sizing system 20 less sensitive to uniformity fluctuations in the transverse irradiance profile of the light beam illuminating the particles. Therefore, in such a case, because ratios of scattered signals are used for particle sizing, the beam of light may not need to fulfill specific requirements in terms of uniformity and/or power stability. Also, an illuminated particle 22 may be located anywhere in the monitored volume 24 without significantly degrading the validity of the size determination.

It is also to be noted that, in some implementations, the light deflectors 28a to 28c and the image capture device 30 can define an imaging module 42 for use in the particle sizing system 20. In the exemplary embodiments presented below, the imaging module 42 is depicted and described as forming part of the particle sizing system 20. However, it will be understood that, in other embodiments, the imaging module 42 may be manufactured and sold as a separate integrated unit for use in a particle sizing system with other components, for example, but not limited to, an optical source and a processing unit. However, in either case the imaging module 42 includes the plurality of light deflectors 28a to 28c positioned to receive and deflect light scattered 38 by illuminated particles 22 contained in the monitored volume 24 and illuminated by the light beam 34, and the image capture device 30 for collecting deflected scattered light 40 from each of the light deflectors 28a to 28c.

In some implementations, the imaging module 42 may be used in combination with a computer readable memory 43 storing computer executable instructions thereon that when executed by a computer or a processing unit 32 perform certain steps. These steps can include, without being limited to, receiving the image acquired by the image capture device 30 of the imaging module 42 and, for each illuminated particle 22: identify the plurality of spots associated with the illuminated particle 22 in the plurality of sub-images; determine the spot parameter associated with each of the plurality of spots; and determine the size of the illuminated particle 22 from the plurality of spot parameters.

As used herein, the term "computer readable memory" is intended to refer to a non-transitory and tangible computer product that can store and communicate executable instructions for performing particle sizing analysis from the image acquired by the image capture device. The computer readable memory 43 can be any computer data storage device or assembly of such devices including, for example: a temporary storage unit such as a random-access memory (RAM) or dynamic RAM; a permanent storage such as a hard disk; an optical storage device, such as a CD or DVD (rewritable or write once/read only); a flash memory; and/or other non-transitory memory technologies. A plurality of such storage devices may be provided, as can be understood by one of ordinary skill in the art. The computer readable memory 43 may be associated with, coupled to or included in the processing unit 32, wherein the processing unit 32 is configured to execute instructions stored in the computer readable memory 43.

More details regarding various structural and operational features of the particle sizing system and the imaging module for use therein will now be given below, with reference to the exemplary embodiments of FIGS. 5 to 15B.

Figure 5:
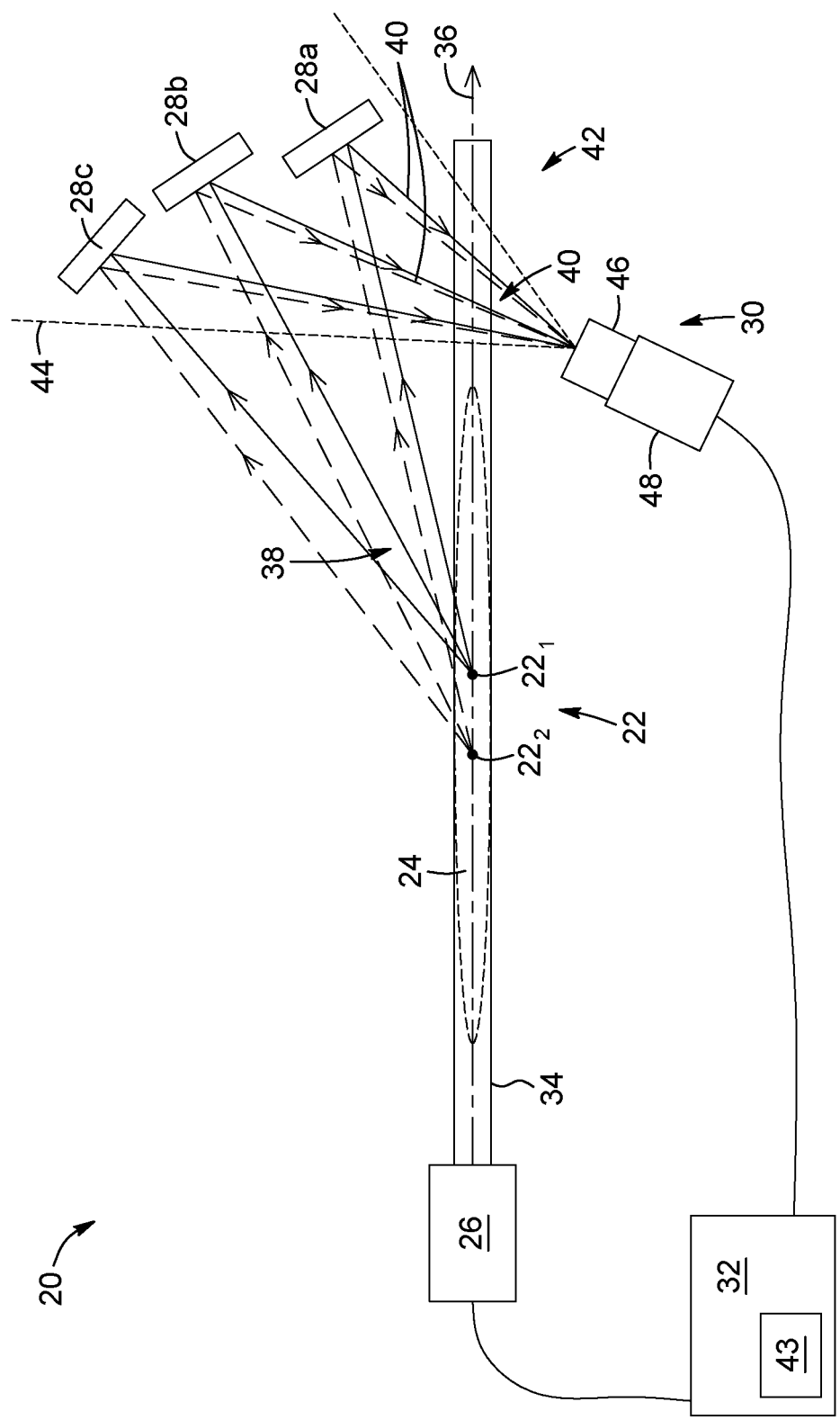
FIG. 5 is a schematic top view of a particle sizing system, in accordance with an embodiment.

Referring more specifically to FIG. 5, there is shown a first exemplary embodiment of a particle sizing system 20. The particle sizing system 20 first includes an optical source 26. The optical source 26 generates a light beam 34 illuminating particles 22 contained in a monitored volume 24, so as to cause part of the light beam 34 to be scattered by the illuminated particles 22. Each illuminated particle 22 produces scattered light 38 from a respective location in the monitored volume 24. It will be recognized that while FIG. 5 depicts light 38 scattered from only two particles $22_1$, $22_2$ for clarity, in practice, the number of particles contained in the monitored volume 24 at any given time could differ depending on the particular application.

The optical source 26 can be embodied by any appropriate device or combination of devices apt to generate a light beam 34 suitable for optical scattering-based particle sizing applications. By way of example, in some implementations, the optical source 26 may be a laser source configured to generate the light beam 34 as a collimated laser beam, for example with a relatively small divergence of the order of a few milliradians (e.g., between 1 and 3 milliradians). The laser beam may be monochromatic, although its spectrum could spread over a certain extent on either side of its central wavelength. The laser beam may be polarized or not, and be operated in both continuous-wave and pulsed regimes.

By way of example, in a non-limiting embodiment, the optical source 26 can be a frequency-doubled diode-pumped solid-state Nd:YAG laser module generating a laser beam having a wavelength of 532 nm, a linewidth smaller than 1 nm, a beam diameter smaller than 2.5 mm full width at $1/e^2$, an approximately Gaussian transverse irradiance profile, and carrying an average power of approximately 10 milliwatts (mW). Of course, various other types of laser sources appropriate to generate a laser beam having suitable characteristics may be used to perform the present techniques such as, for example, a gas laser, a solid-state laser, a diode laser, a dye laser, a fiber laser, and the like. The choice of the optical source can be dictated by several factors including, without limitation, the wavelength, power, spatial and spectral profiles, and, for a pulsed optical source, the pulse characteristics.

It will be understood that the irradiance of the light beam 34 is generally not uniform over its cross-sectional area, being usually larger in regions close to the optical axis 36 and to the optical source 26. This means that the irradiance of the light incident on a particle 22 will in generally vary with the particle location in the monitored volume 24. As a consequence, the intensity of scattered light will also depend on particle position within the monitored volume 24. In some implementations, using a light beam 34 with a non-uniform irradiance distribution, such as a Gaussian profile, may advantageously extend the particle size range that can be measured with the particle sizing system 20.

Turning briefly to FIGS. 15A and 15B, the light beam illuminating the particles 22 present in the monitored volume 24 may be fan-shaped along one of its transverse dimension. In such a case, the particle sizing system may further include a beam conditioning element 68 disposed between the optical source 26 and the monitored volume 24 for shaping or converting the light beam 34 into a fan-shaped beam 70. As described further below, using a fan-shaped beam 70 may provide a way to increase the size of the monitored volume 24 (e.g., by one to three orders of magnitude), which may be advantageous at low particle concentrations.

The wavelength of the light beam 34 could be in the visible range to match most commercially available image capture devices, or in any appropriate portion of the electromagnetic spectrum adapted to a particular range of particle diameters to be measured. By way of example, a rule of thumb that may be utilized is that for angles of observation smaller than 25°, adequate particle sizing may be achieved if the light wavelength is about twice the particle diameter to be measured, as it would yield a signal ratio larger than 1.2 between the smallest and largest observation angles. For example, for particles having a diameter larger than 250 nm, the difference in signal levels between intensities scattered at 5° and 25° will generally be larger than 20% with a wavelength lower than 500 nm.

Besides laser sources, other types of optical sources may be used in some embodiments including, without limitation, light-emitting diodes (LEDs) and other broadband light sources. By way of example, diode laser sources with a linewidth ranging from a few nm to about 10 nm or fiber-coupled LEDs with a linewidth in the range of 30 nm could be used. The beam radiated from a fiber-coupled LED could be collimated with a suitable beam collimator to get an illumination light beam with the required or desired size characteristics. For example, this could allow the light beam to change from a top-hat to a Gaussian transverse irradiance profile as the distance from the optical source increases. In some implementations, the relatively flat cross-sectional irradiance profile of top-hat beams could simplify the analysis of absolute scattered intensity measurement data and the calculation of particle size distributions.

It is to be noted that the oscillations in the particle scattering response as function of size and scattering angle could be reduced significantly when using LED sources, due to the averaging of the scattering cross section provided by the extended LED emission spectra. Accordingly, depending of the dimensions and wavelength ranges involved the Mie scattering theory may provide information on the extent of these oscillations. If required, strategies for reducing the amplitude of these oscillations in the particle sizing analysis could then be implemented.

Further embodiments can use optical sources having a broad spectral bandwidth, possibly in conjunction with a spectrally-resolving image capture device or with multiple image capture devices combined or not with dichroic or Bayer optical filters. An alternative to a broadband optical source can involve using multiple optical sources generating monochromatic light beams of different colors and that are made collinear. In yet other embodiments, the optical source could be embodied by a multi-frequency source (e.g., a Nd:YAG laser) with frequency conversion capabilities for providing two or three output wavelengths (e.g., 1064 nm, 532 nm and 355 nm). Such optical sources may provide complementary particle size distribution information by extending the range of particle sizes that can be measured, with the optical scattering at shorter and longer wavelengths being generally more sensitive to smaller and larger particles, respectively. It is noted that using a multi-frequency or broadband optical source, in combination with an image capture device with spectrally-resolved imaging capabilities could allow information on both particle size and composition to be obtained from the same system.

In the embodiment of FIG. 5, the particle sizing system 20 also includes a plurality of light deflectors 28a to 28c, each of which positioned to receive and deflect light 38 scattered from the illuminated particles 22. As used herein, the term "light deflector" is intended to refer to an optical element or a combination of optical elements which can redirect, at least partly, the optical path of light incident thereonto. Each light deflector can be embodied by a reflecting, a refracting or a diffracting element, or a combination thereof. Non-limiting examples of light deflectors include plane and curved mirrors, beam splitters, prisms, filters, diffraction gratings and holographic elements.

In the illustrated embodiment, three light deflectors 28a to 28c are provided, although other embodiments may include two or more than three light deflectors. In particular, a pair of light deflectors could be sufficient used to achieve adequate particle sizing for a limited range of particle size. Depending on the application, the light deflectors may be different from or identical to one another.

In the embodiment of FIG. 5, the plurality of light deflectors 28a to 28c consists of three light reflectors embodied by plane mirrors. The plane mirrors may have a reflectivity higher than 90% at the wavelength of the light beam 34, although different values of reflectivity could be used in other embodiments. The plane mirrors can have identical or different dimensions. For example, in FIG. 5, the first and second light deflectors 28a, 28b are square mirrors with sides 25 mm long, while the third light deflector 28c is a square mirror with sides of 50 mm. These dimensions are provided for the purpose of illustration only, such that the size and shape of the light deflectors 28a to 28c may differ in other embodiments. In the embodiment of FIG. 5, each of the light deflectors 28a to 28c is positioned relative to the intended monitored volume to intercept and deflect a respective forward scattered component of the light 38 scattered from the illuminated particles 22, each forward scattered component lying within a distinct scattering angle range.

As mentioned above, in some embodiments, the particle sizing system 20 may advantageously determine individual particle size based on ratios of scattered intensities measured at different small forward scattering angles in order to eliminate or at least mitigate the influence of particle composition on the size determination analysis. Additionally, in some cases, the plurality of light deflectors 28a to 28c may be positioned so that their surface normals are parallel to a common horizontal plane, referred to herein as the "system plane". In FIG. 5, the system plane is parallel to the plane of the page and contains both the optical axis 36 of the light beam 34 and the optical axis of the image capture device 30.

In order to use more efficiently the available photosensitive surface of the image capture device 30, the vertical dimension of each light deflector 28a to 28c may be selected to match the vertical dimension of the field of view of the image capture device 30. Furthermore, the light beam 34 illuminating the particles 22 could be shaped as a fan-shaped beam, as depicted in FIGS. 15A and 15B, with the plane of the fan-shaped beam oriented perpendicularly to the system plane. In such implementations, a greater fraction, and possibly all, of the photosensitive surface of the image capture device 30 could be used.

Referring still to FIG. 5, each light deflector 28a to 28c may be characterized by an angle $\theta_a$, $\theta_b$, $\theta_c$ relative to the optical axis 36, a distance from the optical axis 36, and a distance from the image capture device 30. The angle $\theta_a$, $\theta_b$, $\theta_c$ of each light deflector 28a to 28c is defined herein as the angle made between the optical axis 36 of the illumination light beam 34 and a line extending between a scattering point in the monitored volume 24 and the center of the deflector 28a to 28c, such that light scattered from the scattering point and impinging on the center of the deflector 28a to 28c is deflected along a path that intersects the optical axis of the image capture device 30 at the exit plane of the collecting optics 46. The distance of each light deflector 28a to 28c from the optical axis 36 corresponds to the distance between the center of the light deflector 28a to 28c and the location on the optical axis 36 of the vertex of the corresponding scattering angle $\theta_a$, $\theta_b$, $\theta_c$. Finally, the distance of each light deflector 28a to 28c from the image capture device 30 corresponds to the distance between the center of the light deflector 28a to 28c and the point of intersection of the optical axis of the image capture device 30 on the exit plane of the collecting optics 46.

In some implementations, additional light deflectors (not shown) could be added above and/or below the "main" light deflectors 28a to 28c illustrated in FIG. 5. Each of these additional light deflectors could be embodied by a plane mirror and be oriented slightly differently relative to the monitored volume 24. While the surface normals to the deflecting surfaces of the main light deflectors 28a to 28c are parallel to the system plane in FIG. 5, those of the deflecting surfaces of the additional light deflectors are not. The provision of these additional light deflectors could improve the accuracy of the particle size determination, especially when the range of sizes of the particles contained in the monitored volume 24 is wide. Also, by tilting the additional light deflectors with respect to the main light deflectors 28a to 28c, a larger proportion of the photosensitive surface of the image capture device 30 could be used.

In the embodiment of FIG. 5, the particle sizing system 20 further includes an image capture device 30 collecting deflected scattered light 40 received within its field of view 44 from each of the light deflectors 28a to 28c. Advantageously, a single image capture device can be used to collect deflected scattered light from each light deflector. As used herein, the term "image capture device" refers to any device or combination of devices capable of acquiring an image representing light scattered by the illuminated particles in the monitored volume and containing information about the spatial distribution of the illuminated particles in the monitored volume, such that particles at different locations in the monitored volume are imaged on distinct regions in the image. The term "field of view" refers to the angular extent of the scene that can be imaged by the image capture device. As mentioned above, in some embodiments, more than one image capture device may be provided if the optical source has a broad spectral bandwidth or if multiple optical sources emitting light in different spectral ranges are used. However, in such cases, each of the image capture devices would generally be configured to collect deflected scattered light from each light deflector.

The field of view 44 of the image capture device 30 encompasses at least partly, and in some cases entirely, each light deflector 28a to 28c. Additionally, it may be advantageous, in some implementations, that the field of view 44 of the image capture device 30 be filled as much as possible by the plurality of light deflectors 28a to 28c. Indeed, generally no valuable information relative to the particles 22 contained in the monitored volume 24 can be retrieved from regions of the image that correspond to dead zones between adjacent light deflectors.

In the embodiment of FIG. 5, the image capture device 30 can include collecting optics 46 adapted to collect deflected scattered light 40 from the plurality of light deflectors 28a to 28c. The collecting optics 46 may include lenses, mirrors, filters, optical fibers and any other suitable reflective, refractive and/or diffractive optical components. For example, in the illustrated embodiment, the collecting optics 46 includes an objective. In a non-limiting exemplary embodiment, the image capture device 30 may have a field of view of 20°, with an objective having a focal length of 12.5 mm and an f-number of 1.4, but other parameter values may be used in other embodiments.

The image capture device may also include a sensor array 48. The term "sensor array" refers herein to a device made up of a plurality of photosensitive elements (pixels) capable to detect electromagnetic radiation incident thereonto from a scene, and to generate an image of the scene, typically by converting the detected radiation into electrical data. Depending on the application, the pixels may be arranged in a two-dimensional or a linear array. The term "pixel data" refers to the image information associated with each pixel and may include intensity data indicative of the total amount of electromagnetic energy absorbed by the pixel over a certain period of time.

The sensor array 48 may be embodied by a complementary metal-oxide-semiconductor (CMOS) or a charge-coupled device (CCD) image sensor, but other types of sensor arrays (e.g., charge injection devices or photodiode arrays) could alternatively be used. By way of example, in a non-limiting embodiment, the sensor array is embodied by CCD image sensor made up of 640×480 pixels with 7.4 μm square pixels Referring to FIG. 5 in conjunction with FIG. 16, the image capture device 30 is configured to output an image 50 consisting of a plurality of sub-images 52a to 52c, each of which being generated from collected light deflected from a respective one of the plurality of light deflectors 28a to 28c. It will be understood that each illuminated particle 22 in the monitored volume 24 will be imaged as a spot 54 (hereinafter referred to collectively and generally as 54, but individually as $54a_1$, $54a_2$, $54b_1$, $54b_2$, $54c_1$ and $54c_2$) in each one of the plurality of sub-images 52a to 52c. Therefore, the plurality of spots 54 associated with each particle 22 corresponds to light scattered at a plurality of scattering angles.

By way of example, in FIG. 16, the image 50 includes three sub-images 52a to 52c associated respectively with the three light deflectors 28a to 28c depicted in FIG. 5. Each sub-image 52a to 52c includes two spots 54, each spot 54 being associated with one of the two illuminated particles $22_1$, $22_2$ in the monitored volume 24. More specifically, the first sub-image 52a includes a first spot $54a_1$ representing light scattered by the first particle $22_1$ and deflected by the first light deflector 28a, and a second spot 54a2 representing light scattered by the second particle $22_2$ and deflected by the first light deflector 28a. Meanwhile, the second sub-image 52b includes a first spot 54b1 representing light scattered by the first particle $22_1$ and deflected by the second light deflector 28b, and a second spot $54b_2$ representing light scattered by the second particle $22_2$ and deflected by the second light deflector 28b. Finally, the third sub-image 52c includes a first spot $54c_1$ representing light scattered by the first particle $22_1$ and deflected by the third light deflector 28c, and a second spot $54c_2$ representing light scattered by the second particle $22_2$ and deflected by the third light deflector 28c. It is noted that the size, shape and separation of the spots 54 in FIG. 16 are not necessarily depicted to scale.

It will be understood that when the light beam 34 incident on the particles 22 in the monitored volume 24 is a pencil beam and when the surface normals to the deflecting surfaces of the plurality of light deflectors 28a to 28c are parallel to a common plane, then the spots 54 acquired by the image capture device 30 will generally spread along a line in the image 50. However, in other configurations of the particle sizing system 20, spots 54 may be formed along two dimensions of the image 50 without departing from the scope of the techniques described herein.

It will be understood that one possible advantage of using a single image capture device is that the measurement of scattered light signals received from different ones of the plurality of light deflectors can be automatically synchronized through the exposure time of the image capture device. By contrast, using a plurality of independent image capture devices, each of which collecting scattered light from a corresponding one of the plurality of light deflectors may not be straightforward. Indeed, depending on the time resolution of the measurements and the transit time of the particles across the monitored volume, interpreting and analyzing the results can become quite complex when more than one image capture device is employed.

It will also be understood that the scattered path length between a given particle and the image capture device will generally vary depending on which of the plurality of light deflectors has redirected the scattered light on the image capture device. Therefore, for each particle, the spots in different sub-images will generally not be focused with the same efficiency. Depending on the application, this may or may not provide an advantage. By way of example, in the embodiment of FIG. 5, the scattered path length is greater for scattered light reaching the image capture device 30 via the third light deflector 28c. Therefore, if the spot representing a given particle is sharply focused in the third sub-image, it may be slightly blurred in the first and second sub-images. All things being equal, the measured signal would tend to be more intense for the smaller, more-focused spot in the third sub-image than for the larger, less-focused spot in each of the first and second sub-images. However, this difference could be at least partly compensated for by the fact that the scattering cross section efficiency would tend to be smaller for the third light deflector 28c. This is due notably to the fact that the third light deflector 28c deflects light scattered at larger scattering angles and over a smaller solid angle than the first and second light deflectors 28a, 28b. Therefore, taking advantage of the different scattering cross section efficiencies associated with the different light deflectors 28a to 28c can provide a way to use the available dynamic range of the image capture device 30 more efficiently.

It will be understood that particles are usually not stationary in the monitored volume since they are carried by the flow of air or liquid in the host medium. By way of example, for a light beam having a diameter of about 4 mm and air velocity of about 1 meter per second (m/s) in a direction perpendicular to the optical axis 36, the transit time of a particle across the width of the beam will be 4 milliseconds (ms). The exposure time of commercially available image capture devices can be of the order of 1 ms and, in some cases, as low as 10 microseconds (µs). In the above example, using an exposure time longer than 4 ms with a refresh rate of 33 frames per second may increase the likelihood of having a particle passing through the central region of the light beam during the image acquisition process and, thus, the likelihood of detecting a particle. Hence, by increasing the exposure time, the size of the volume monitored by the particle sizing system is effectively increased due to the fact that more particles cross the light beam.

The possibility to increase the effective size of the monitored volume by increasing the exposure time may be useful when the particle concentration is small (e.g., when there is on average one or less than one particle present in the monitored volume during the exposure time). Furthermore, the signal intensity detected by the image capture device for a given particle will also increase if it represents the summation of a number of adjacent pixels above a threshold level, which reflects the fact that a moving particle may produce a linear trace in the image acquired by the image capture device.

It is also worth mentioning that by increasing the exposure time, the likelihood that a given particle passes through a high-intensity region of the light beam also generally increases, thus making the particle more readily detectable. However, at high particle concentrations, increasing the exposure time may increase the likelihood of coincidental particle detections which, in turn, may affect the size determination analysis. It may further be possible to use different exposure times over a certain period of time, for example over one minute or one second.

The rate at which images are acquired by the image capture device may also affect the monitored volume over time. By way of example, in some implementations, the refresh rate of the image capture device may be selected so as to avoid a certain particle to be detected in one region of the light beam in one image, and in another region of the light beam in a subsequent image, as this could artificially increase the count and concentration level for the corresponding particle size, especially for larger particles that may still be detected close to the edge of the monitored volume.

It will thus be understood that, depending on the particle concentration level, compromises may need to be made between the exposure time, the refresh rate, the aperture size and the depth of focus of the image capture device in order to provide accurate particle sizing capabilities over different particle size ranges and accurate statistical results from which particle size distribution information may be determined.

In some implementations, it may be advantageous to reduce or at least manage the ambient light conditions in order to operate the particle sizing system in different environmental conditions. Ambient light can generally manifest itself in the image acquired by the image capture device in two ways. First, ambient light can illuminate background objects present in the field of view of the image capture device, which, in turn, can generate a signal in the image. Second, ambient light can illuminate the particles in the monitored volume, thereby generating scattered light that adds to the scattered light caused by the illumination light beam.

Therefore, in some implementations, it may be desirable or required to reduce ambient light contamination, for example with temporal filtering (e.g., by using a pulsed or modulated optical source combined with a synchronous detection scheme) or spatial filtering (e.g., by using dedicated deflectors or baffles around the monitored volume and/or near the optical source). In particular, in a non-limiting exemplary embodiment, the power of the optical source may be modulated or pulsed synchronously with the image capture device. In such a case, if at each modulation or pulse the power output is changed, an extended equivalent dynamic range may be achieved from the combinations of different optical source powers at different times, assuming that the particle size distribution does not vary much over the time period of the power modulation or pulse. In such implementations, it may be easier to take into account the manner in which the probability of detecting particles and the size of the effective monitored volume each depend on particle size, thus possibly optimizing the overall statistics for different classes of particle size.

In the embodiment of FIG. 5, the particle sizing system 20 also includes a processing unit 32 that retrieves the image acquired by the image capture device 30 from a computer readable memory 43 included in the processing unit 32. In such a case, the processing unit 32 is configured to execute instructions stored in the computer readable memory 43. In some embodiments, the processing unit 32 and the image capture device 30 may be integrated as a single unit. In other embodiments, the processing unit 32 and the image capture device 30 may be distinctly separate. In such a case, the processing unit 32 may be operatively connected to the image capture device 30 via wired or wireless communication links. In some embodiments, the processing unit 32 may also be connected to other components of the particle sizing system 20, for example the optical source 26, as depicted in FIG. 5.

Depending on the application, the processing unit 32 can start to analyze the image upon receiving it from the image capture device 30 (i.e., in real-time or near real-time), or may store the image for later analysis.

Referring again to both FIGS. 5 and 16, the processing unit 32 is configured to identify the plurality of spots 54 associated with each particle 22 in the plurality of sub-images 52a to 52c. It is to be noted that with appropriate mapping between spatial and image coordinates, it may be possible to determine on which pixels of each sub-image 52a to 52c is recorded the light scattered from a particle 22 at a given location in the monitored volume 24 after deflection from a given one of the light deflectors 28a to 28c. The different spots 54 associated with a given illuminated particle 22 can thus provide a measure of the distribution of the intensity of light scattered from the particle 22 at different scattering angles.

In other words, the spot identification process can make it possible to assign both an angle and a distance of observation for each spot 54 in the image 50 acquired by the image capture device 30. Using this mapping between spot locations in the image 50 and particle locations in the monitored volume 24, differences in signal strength at different observation angles can be accounted for by considering the differences in the distances of observation associated with different light deflectors 28a to 28c. In some implementations, the identification of spots 54 associated with each particle can involve searching and identifying, in the region of the image 50 corresponding to the monitored volume 24, pixel signal levels that are above certain thresholds. The thresholds may have been previously established through calibration. The spots may be defined by grouping adjacent pixels whose signal levels are above one of the predetermined thresholds.

It is noted that using a plurality of light deflectors to form an image made of a corresponding plurality of sub-images, each of which representing a different angle of observation of the monitored volume, is similar to using multiple image capture devices to obtain information about the monitored volume from different points of view. Such a technique is also known as stereoscopic imaging. As known in the art, stereoscopic imaging can allow the position of an object in a three-dimensional space to be assessed by identifying and correlating features of the object as observed from different vantage points.

With proper calibration of the positions of the light deflectors and the image capture device relative to one another and to the light beam, the present techniques can make use of principles similar to those used in stereoscopic imaging to map spot locations in the image acquired by the image capture device to particle locations in the monitored volume. This mapping can allow the determination of the angle and distance of each particle relative to the image capture device and the plurality of light deflectors. This positional information can be used to properly compare measurement and reference data. Furthermore, depending on the resolution of the image capture device, information on particle location may be obtained not only along the optical axis of the light beam, but also within its cross section.

In some implementations, a more accurate determination of the particle size distribution may be obtained when information about the transverse irradiance profile of the light beam and the position of particles within its cross section is used. Particle classification based on comparing the magnitude of scattered intensity signals will generally depend on the position of the particles within the cross-sectional area of the illuminating light beam. As mentioned above, the irradiance is generally not uniform over the cross-sectional area of the light beam, being generally larger at the center of the beam and progressively decreasing toward its periphery. The scattered light intensity being dependent on the incident light intensity, it will follow the same behavior.

The processing unit 32 is also configured to compute a spot parameter for each of the plurality of spots 54 associated to a given particle 22. As mentioned above, in some implementations, the spot parameters may be energy parameters, each of which being indicative of an amount of energy contained in the spot 52 associated therewith. In other implementations, the spot parameters may correspond to a size, a shape, a spectral content of the spots, or any combination thereof. Determining the spot parameter of a particular spot may involve summing the pixel signals of all the pixels belonging to this spot. In some implementations, the signal intensity of each spot may be corrected by taking into account the distance of observation of the scattering particle associated with the spot.

The processing unit 32 is further configured to compute a size of each one of the illuminated particle 22 from the plurality of spot parameters associated therewith. In some implementations, the processing unit 32 can be configured to determine the size of each illuminated particle 22 from one or more ratios between the spot parameters (e.g., energy parameters). By way of example, in an embodiment where the scattering angles of the scattered light collected by the image capture device 30 after deflection from the plurality of light deflectors are respectively $\theta_a$, $\theta_b$, $\theta_c$, one or more of the following ratios may be calculated: $R_1(\theta_a, \theta_b)=I_{\theta a}/I_{\theta b}$, $R_2(\theta_a, \theta_c)=I_{\theta a}/I_{\theta c}$ and $R_3(\theta_b, \theta_c)=I_{\theta b}/I_{\theta c}$. In these ratios, the quantities $I_{\theta a}$, $I_{\theta b}$, and $I_{\theta c}$ correspond to the intensities of collected light scattered from an illuminated particle 22 at a scattering angle equal to $\theta_a$, $\theta_b$, $\theta_c$.

The processing unit 32 may be further configured to determine the size of the particle 22 associated with each set of spots 54 from a comparison of the one or more of intensity ratios $R_1(\theta_a, \theta_b)$, $R_2(\theta_a, \theta_c)$ and $R_3(\theta_b, \theta_c)$ with reference data. It will be understood that while a certain number of intensity ratios may be calculated depending on the number of light deflectors 28a to 28c, not all these ratios need to be used in every calculation if using a lower number of ratios allows a sufficiently accurate particle size determination.

Also, as mentioned above, the reference data can be obtained from a model based on the Mie scattering theory or another suitable theory. By way of example, the Mie theory may be used to calculate, for each particle identified in the image, theoretical values for the ratios $R_1(\theta_a, \theta_b)$, $R_2(\theta_a, \theta_c)$ and $R_3(\theta_b, \theta_c)$ for a range of particle sizes, and to find the particle size for which these ratios best fit those obtained from the measurement data. It will be understood that given the many computational approaches available for numerically or analytically modeling the scattering response of particles, various techniques could be employed to obtain the reference data. Alternatively or additionally, at least part of the reference data may originate from previously calculated and/or measured experimental data stored in a database. Such a database may include reference data for several particle sizes, compositions, shapes, distances, scattering angles, and the like. Depending on the application, the step of obtaining reference data and the step of comparing the reference data with measurement data may each be carried out in real-time or near real-time, or retrospectively as post-measurement steps.

In some implementations, the Mie scattering theory can be used to calculate the angular scattering cross section of a particle at the corresponding wavelength(s) of the illumination light beam and for a range of scattering angles and a range of particle sizes. The calculation may also be performed for different refractive indices corresponding to different particle compositions. By way of example, in one non-limiting embodiment, three different refractive indices may be chosen, corresponding to quartz, dust-like and coal particles. Light polarization may also be taken into account, if required or desired. Ratios of scattered intensities measured at different observation angles and associated with spots belonging to a same particle may then be calculated, taking into account the angular coverage of the particle sizing system at each observation angle. Each set of spots associated with a particle should include at least two spots in order for at least one ratio to be calculated therefrom. Optionally, the spectral content of the light beam illuminating the particle may also be accounted for. Finally, the particle size at which the calculated ratios best match the measured ratios is found. In some implementations, criteria including signal levels and ratios possibly calculated from extrapolated saturated signal can be taken into account in the assessment of the best match. This process may be repeated for each set of spots.

As mentioned above, the scattered path length between a given particle and the image capture device will generally vary depending on which of the plurality of light deflectors has redirected the scattered light onto the image capture device. In some implementations, these different scattered path lengths may significantly affect the measured intensity of scattered light received from the different light deflectors, and need to be taken in account when ratios between scattered intensities measured at pairs of scattering angles are compared with reference data.

It will also be understood that, in general, the scattering angle associated with a given spot in the image of the monitored volume acquired by the image capture device covers a certain range of scattering angles (e.g., less than 1°) around a main value. This scattering angle range can vary as a function of the location of the scattering particle in the monitored volume and depending on which of the light deflectors is involved in the collection process. The span of the different scattering angle ranges may affect the intensity of the measured scattered signals and may have to be accounted for when comparing measurement and reference data.

It is worth mentioning that, while some implementations may use ratios or other relations between scattered intensities at different scattering angles, other implementations may alternatively or additionally use absolute values of scattered intensities. As mentioned above, absolute measurements may be useful to pre-classify each particle as belonging to one of different particle size ranges. By way of example, the absolute values of scattered intensities at different angles may be used to pre-categorize particles in the monitored volume as being small (e.g., with a diameter smaller than 1 μm), intermediate (e.g. with a diameter between 1 μm and 10 μm) and large (e.g., with a diameter larger than 10 μm). It will be understood that particle sizing using absolute measurements may be more sensitive to the accuracy with which the particle position can be determined than particle sizing based solely on relative measurements.

As mentioned above, the optical source may be embodied by a multi-wavelength or a broadband source while the image capture device may have spectral imaging capabilities. In such implementations, the spots identified in the image acquired by the image capture device may contain information about the spectral content of the scattered light collected at different scattering angles. In turn, this spectral content may be used to obtain information about both the size and composition of the particle. In some implementations, the polarization of the collected scattered light may be measured in order to yield information about the size of smaller particles (e.g., less than 200 nm in diameter), the shape, the phase (e.g., solid or liquid) and/or the composition of the particles.

In some implementations, the particle sizing system can advantageously allow the detection of particles that are at different locations inside the monitored volume. Therefore, in some implementations, the monitored volume could be made larger with the present techniques than with conventional techniques in which particles are supplied to the optical interrogation region using a vacuum-based pumping system.

Another advantage of some embodiments of the present techniques is that they can allow the size of more than one particle to be determined per measurement or image. This is typically not possible with conventional light scattering particle counters, since they are usually limited in terms of the particle concentration level than can be measured without having interference between particles passing simultaneously in the optical detection area. By contrast, some of the techniques described herein can provide different sets of scattered signals for particles that are at different locations in the monitored volume, unless the particles are superposed or stuck together.

The present techniques may also be advantageous at low concentration levels by providing a statistically representative particle size distribution in a shorter period of time due to the relatively large monitored volume that can be achieved. In some implementations, a particle size distribution may be obtained by combining individual particle size measurements acquired either sequentially over the monitored volume or simultaneously for multiple particles inside the monitored volume if the monitored volume is sufficiently large.

Another possible advantage of some implementations of the techniques described herein is that they may allow non-intrusive particle size measurements to be performed in situ and from a standoff position. In particular, in some implementations, particle sizing may be achieved in an open air environment and without requiring the particles to be sampled from the ambient medium and supplied to the monitored volume by a vacuum-based pumping system. In situ measurements can prevent or at least reduce environmental perturbations, interferences and bias caused by the particle sampling process and/or the presence of the particle sizing system itself and any associated components (e.g., inlets biased to a certain particle size, particles breaking up as a result of hitting system components, particle deposition on wall surfaces, and the like). Additionally, with in situ measurements, there is generally no need to calibrate and maintain pumping equipment to ensure proper knowledge of the supply rate of particles in the monitored volume. Of course, it will be understood that, in some implementations, a pumping system may be used without departing from the scope of the present techniques.

The techniques described herein allow the size of individual particles in a monitored volume to be determined based on the assumption that scattered light from different particles correspond to different spots in the image acquired by the image capture device. In other words, it is assumed that the particle sizing system will detect only one particle at a time at a given location in the monitored volume. In some implementations, in order for this assumption to be fulfilled, the average number of particles within a certain region of space should not exceed one. In a first approximation, this means that the average distance between particles in the monitored volume should be sufficient to produce distinct spots in the image acquired by the image capture device. In other words, the light signals scattered from different particles should preferably not overlap on the image. Otherwise, it may become more challenging to determine particle size with sufficient accuracy.

In the techniques described herein, the number of particles detected within a portion of the light beam can be generally less than one in most environmental and occupation health and safety applications. Also, when the particle concentration increases to a value that causes the number of particles to be detected at a certain observation angle to become larger than one, it may be possible to reduce the field of view or increase the resolution of the image capture device in such a way as to reduce the average size of the portion of the monitored volume imaged on any single pixel.

Figure 6A:
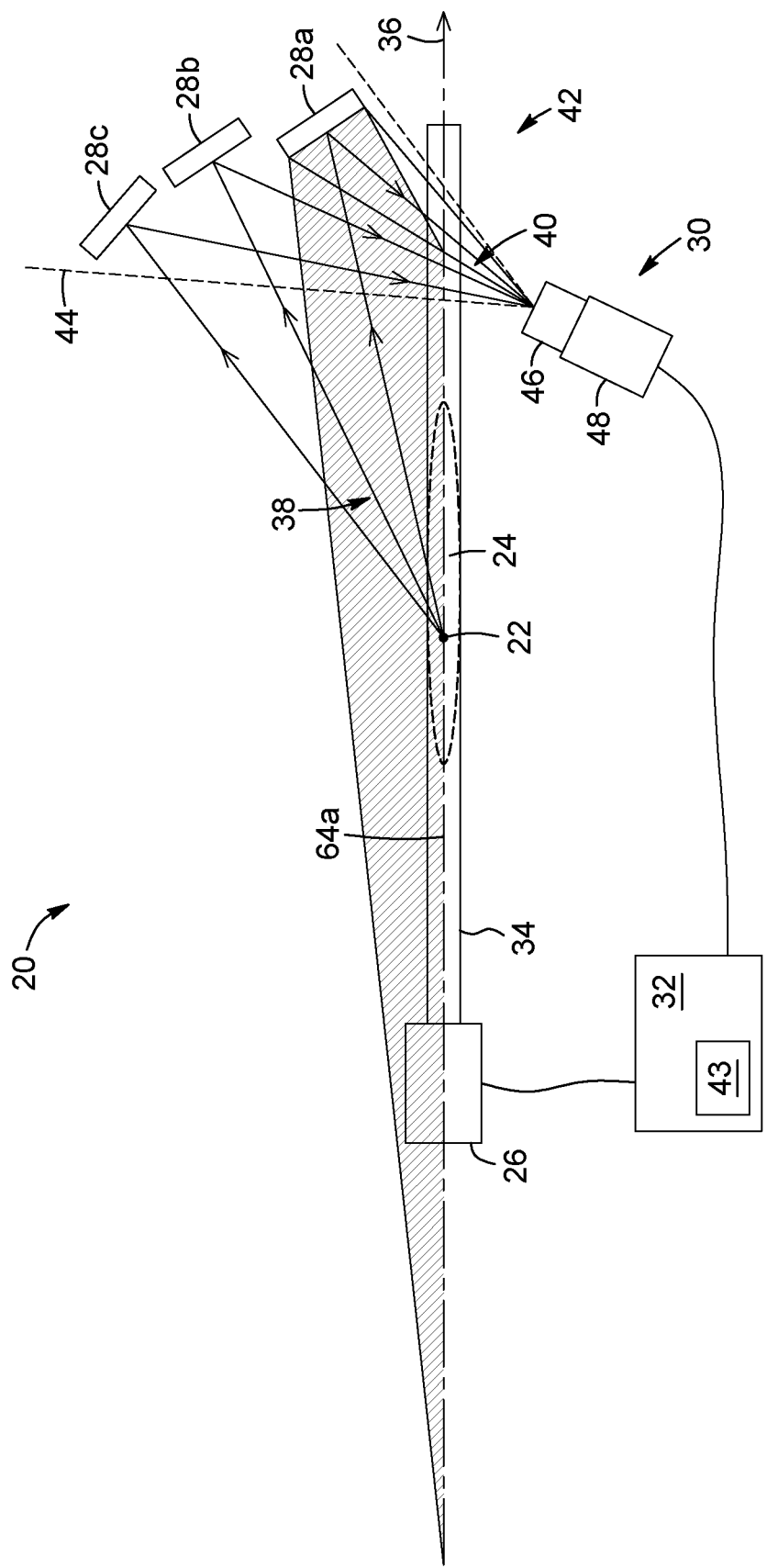
FIGS. 6A to 6C are schematic top views of a same particle sizing system, in accordance with another embodiment. Each of FIGS. 6A to 6C illustrates the angular coverage of one of the plurality of light deflectors of the particle sizing system.
Figure 6B:
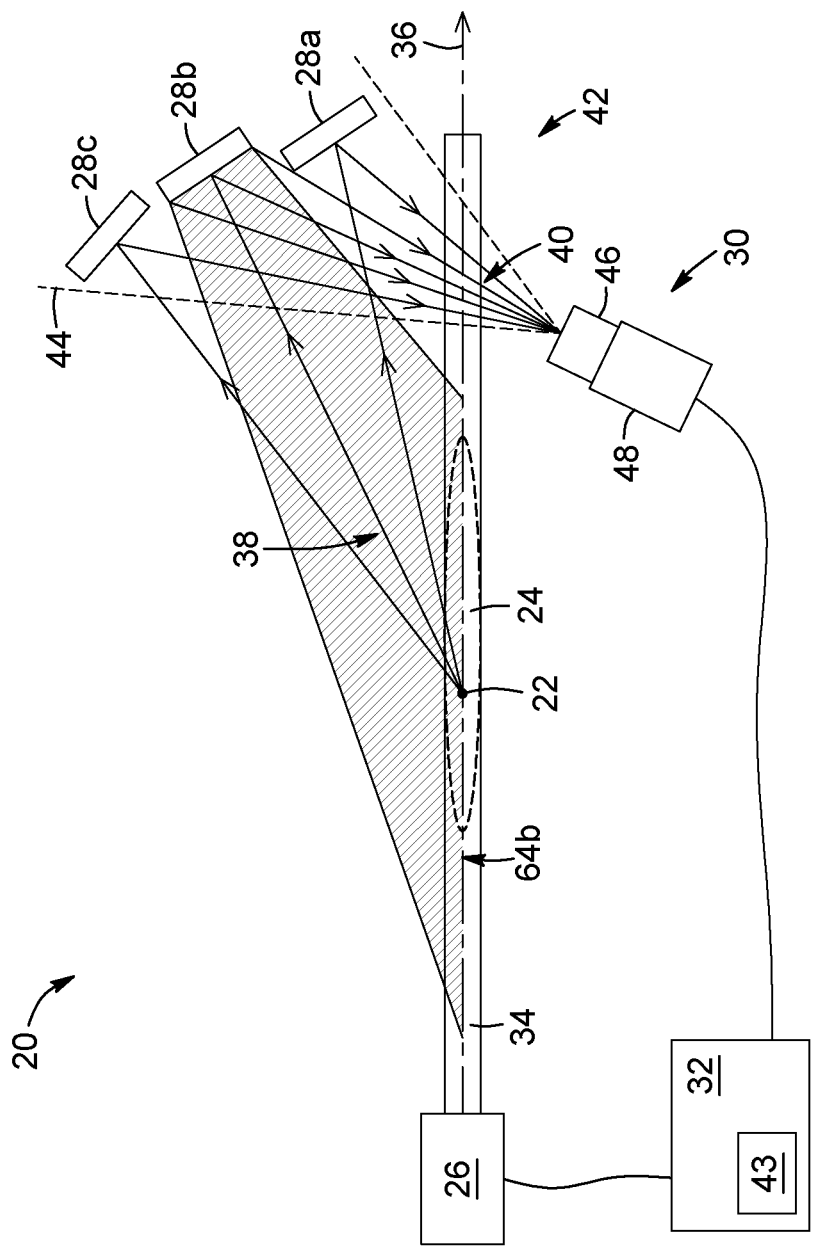
Figure 6C:
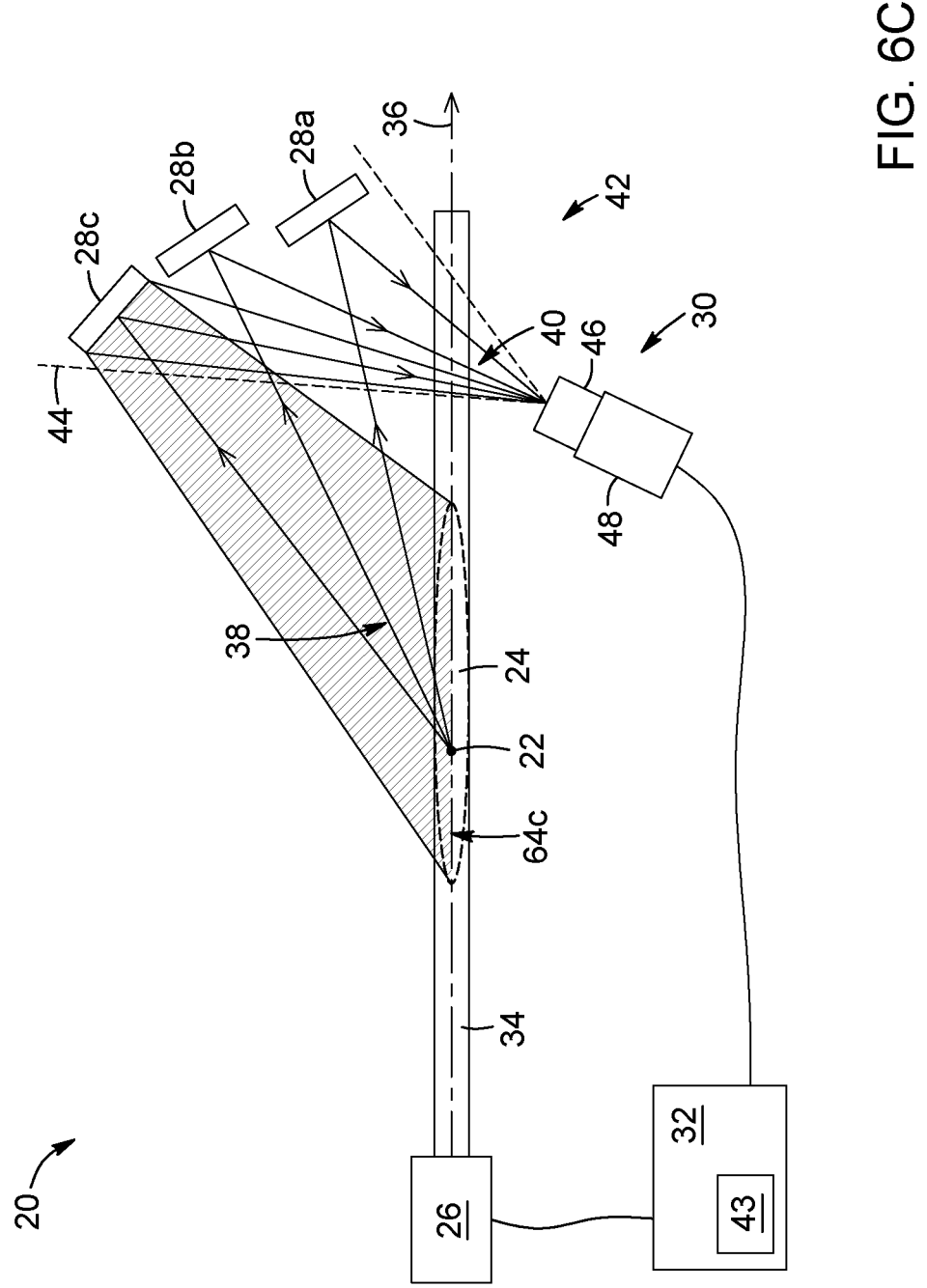

Referring to the embodiment of FIGS. 6A to 6C, by way of example, an image capture device 30 with 640 (H)×480 (V) pixels and a field of view of 20° will be characterized by an angular resolution of 0.03125° per pixel. Each light deflector 28a to 28c may be positioned to cover about 6.3° of the field of view of the image capture device 30. Such a configuration would allow scattered light to be measured at three different observation angles $\theta_a$, $\theta_b$, $\theta_c$ for each particle 22 present in the monitored volume 24.

Referring to FIG. 6A, assuming that the minimum scattering angle $\theta_{a,min}$ associated with the first light deflector 28a is equal to 1°, then the maximum scattering angle $\theta_{a,max}$ would be equal to 7.3°. It is understood that scattered light collected at different scattering angles in the range from $\theta_{a,min}$ to $\theta_{a,max}$ would originate from different locations in an interval 64a along the optical axis 36 of the light beam 34, the location associated with the scattering angle $\theta_{a,max}$ being closer to the first light deflector 28a than the location associated with the scattering angle $\theta_{a,min}$.

FIG. 6B depicts the interval 64b along the optical axis 36 covered by the second light deflector 28b between the minimum and maximum scattering angles $\theta_{b,min}$, $\theta_{b,max}$, while FIG. 6C depicts the interval 64c along the optical axis 36 covered by the third light deflector 28c between the minimum and maximum scattering angles $\theta_{c,min}$, $\theta_{c,max}$. While each of the three light deflectors 28a to 28c is positioned to cover about 6.3° of the field of view of the image capture device 30, the lengths of the intervals 64a to 64c within the angular coverage of each deflector 28a to 28c differ substantially.

It is noted that the monitored volume 24 of the particle sizing system 20 corresponds to the overlap of the three intervals 64a to 64c such that an illuminated particle 22 in the monitored volume 24 will form three different spots in the image acquired by the image capture device 30, each spot corresponding to a different angle of observation and a different scattered path length. Then, as mentioned above, three different ratios $R_1=I_{\theta a}/I_{\theta b}$, $R_2=I_{\theta a}/I_{\theta c}$ and $R_3=I_{\theta b}/I_{\theta c}$ may be calculated from the intensities $I_{\theta a}$, $I_{\theta b}$, and $I_{\theta c}$ of the light scattered from the particle 22 and measured at three different observation angles $\theta_a$, $\theta_b$, $\theta_c$ after deflection from the three light deflectors 28a to 28c, respectively.

As illustrated in FIGS. 6A to 6C, in some implementations, each light deflector 28a to 28c can allow the image capture device 30 to view a relatively large portion of the light beam 34 along the optical axis 36 and to collect light scattered by each illuminated particle present in the monitored volume from multiple angles of observation. It will be understood that having a relatively large monitored volume 24 while ensuring that at most one particle 22 at a time is present on a small portion of the light beam 34 can allow multiple particles to be imaged on different regions of the image acquired by the image capture device 30. Referring also to FIG. 16, it may then become possible to associate the location of each spot 54 in the image 50 whose intensity is above a certain threshold with a corresponding particle location in the monitored volume 24 and a corresponding observation angle $\theta_a$, $\theta_b$, $\theta_c$ associated with one of the light deflectors 28a to 28c.

In some implementations, having particles flowing through the monitored volume 24 rather than stationary particles can make the particle sizing system 20 less susceptible to have an impact on the particle motion and, therefore, on the particle size distribution. Particle movements may also ensure or help ensure that particles are not counted more than once. Generally, this is true as long as the time between successive images acquired by the image capture device 30 remains longer than the transit time of the particles across the light beam. By way of example, assuming that the diameter of the light beam 34 is 0.5 cm and the particles flow perpendicularly to the optical axis 36 at a speed of at 20 cm/s, then the particle population in the monitored volume will be refreshed between successive images as long as the time between acquisitions of successive images is longer than 25 ms. If the particle speed is increased to 2 m/s, then the time between successive images can be reduced to 2.5 ms.

Figure 7:
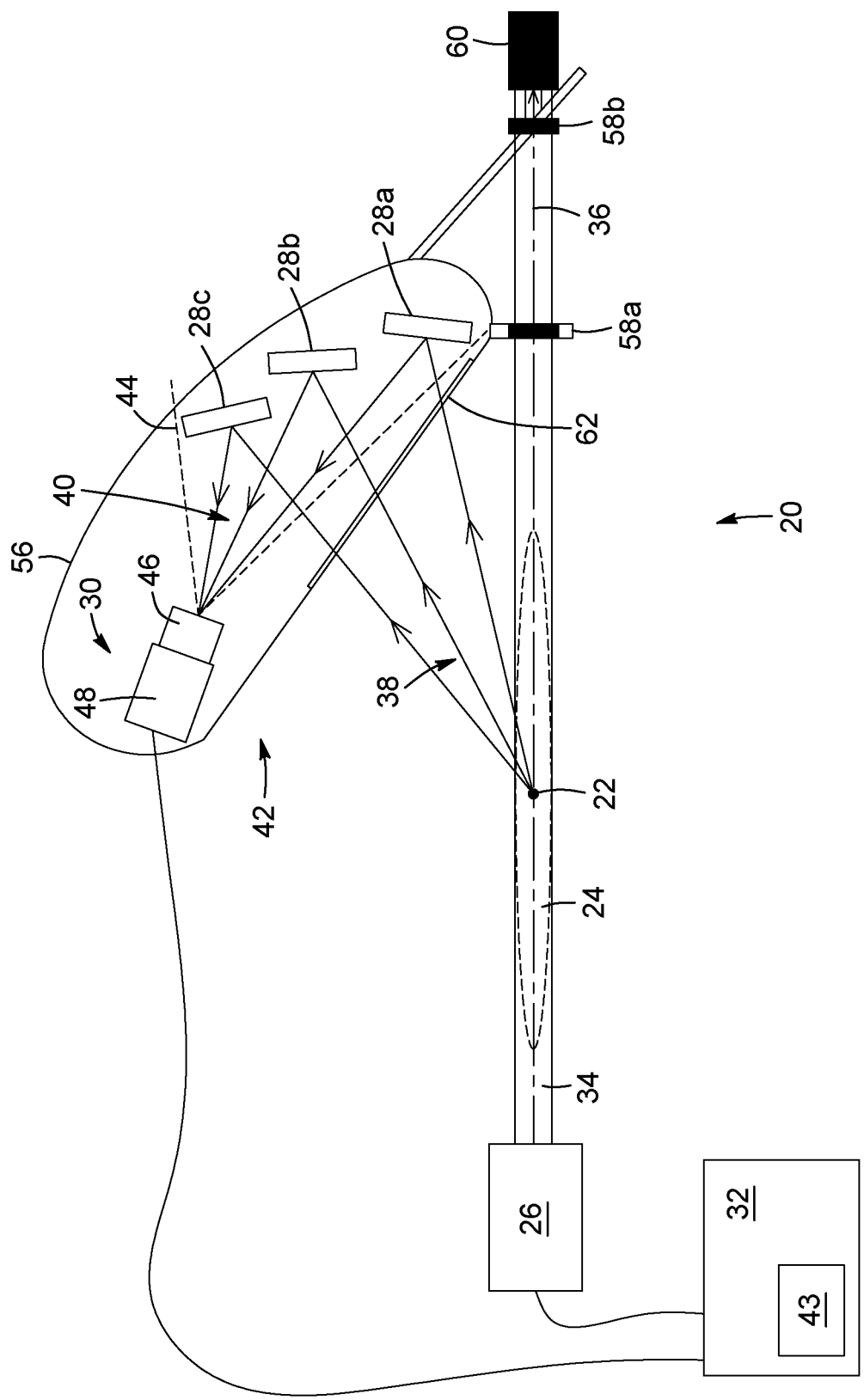
FIG. 7 is a schematic top view of a particle sizing system, in accordance with another embodiment.

Referring now to FIG. 7, another embodiment of a particle sizing system 20 is shown. This embodiment shares many features with the embodiment described above with reference to FIG. 5 in that it generally includes an optical source 26, a plurality of light deflectors 28a to 28c, an image capture device 30, and a processing unit 32. In the embodiment of FIG. 7, the particle sizing system 20 further includes a housing 56 enclosing at least the plurality of deflectors 28a to 28c and the image capture device 30. In some implementations, either or both of the optical source 26 and the processing unit 32 may also be provided inside the housing 56 to facilitate deployment of the particle sizing system 20 in the field.

As used herein, the term "housing" refers to an enclosure that defines a space for accommodating therein at least the plurality of deflectors and the image capture device of the particle sizing system. The housing 56 may be formed as a single integral structure or from two or more housing sections connected to form the housing. In some embodiments, the housing 56 can prevent or help to prevent foreign matter such as rain, snow, mist, fog, dust, pollen and the like from reaching the light deflectors 28a to 28c and the image capture device 30 during field deployments, for example in environmental or industrial monitoring applications, particularly in open air conditions.

The housing 56 can also reduce the risks of damaging or causing misalignment of the light deflectors 28a to 28c, the image capture device 30 or other components as a result of accidental shock to or inadvertent mishandling of the particle sizing system 20. In some implementations, the housing 56 may be smoothly shaped, for example with rounded edges, to minimize or at least reduce air flow interference and turbulence, and thus favor an unimpeded air flow around it. In some implementations, the housing 56 may be portable.

In some implementations, the imaging module 42 of FIG. 7 may be manufactured and sold as a single unit for use with the optical source 26 and the processing unit 32 to form the particle sizing system 20. In such a case, the imaging module 42 may include the housing 56 provided with the optical window 62 and enclosing the plurality of light deflectors 28a to 28c and the image capture device 30. The imaging module 42 could further be sold in combination with or in a kit including a computer readable memory 43 configured to be coupled to the processing unit 32 in such way as to allow the processing unit 32 to execute instructions stored in the computer readable memory 43. The computer readable memory 43 could then be embodied by a non-transitory storage device such as, for example, a hard disk, a CD, a DVD or a flash memory, while the processing unit 32 could be embodied by a personal computer.

In the embodiment of FIG. 7, the optical source 26 is provided outside of the housing 56 and positioned at a standoff distance from the monitored volume 24. However, in other embodiments, the optical source 26 may be located inside the housing 56. When the optical source 26 is outside of the housing 56, the light beam 34 generated by the optical source 26 may be aligned with respect to the housing 56 by using alignment pinholes 58a, 58b provided on the housing 56. Alternatively, one or both of the alignment pinholes 58a, 58b could be replaced by position sensitive detectors. A beam dump 60 may also be provided downstream the alignment pinholes 58a, 58b for better safety. When the particle sizing system 20 is used in the field, the housing 56 and the optical source 26 may each be mounted on tripods or other types of mounting devices (not shown) to provide stable positioning. In some implementations, the optical source 26 may be installed on an adjustable mounting device (not shown) to facilitate the alignment of the light beam 34 relative to the pinholes 58a, 58b provided on the housing 56.

Referring still to FIG. 7, the housing 56 can further include an optical window 62 for allowing part of the light 38 scattered from the particles 22 to be transmitted inside the housing 56 and reach the plurality of light deflectors 28a to 28c which, in turn, will deflect the scattered light 38 toward the image capture device 30. It will be understood that the optical window 62 may be embodied by an opening or aperture defined through the housing 56 or by appropriate optics (e.g., a glass plate) configured to transmit light at the wavelength of interest. In some implementations, engineering measures may be set up to avoid dust or other foreign matter to accumulate on the outer surface of the optical window 62, for example by applying a dedicated coating on it or providing an air curtain in front of it. In some implementations, the particle sizing system 20 may not be significantly affected by foreign matter accumulation on the optical window 62 as long as the optical window 62 can transmit a sufficiently large fraction of the scattered light 38 incident thereon. This may be particularly true in implementations where the particles 22 in the monitored volume 24 produce a sharp focused image on the image capture device 30 while the images of the dust particles present on the optical window 62 are completely out of focus.

In some implementations, the optical window 62 may be embodied by an aperture. In such a case, the inside of the housing 56 may be positively pressurized relative to the outside of the housing 56 and, thus, to the monitored volume 24. In such cases, the maintenance of a positive pressure inside the housing 56 may ensure or help ensure that air is continuously coming out of the housing 56 through the aperture to prevent or help prevent airborne matter from reaching the light deflectors 28a to 28c and the objective of the image capture device 30.

Figure 8:
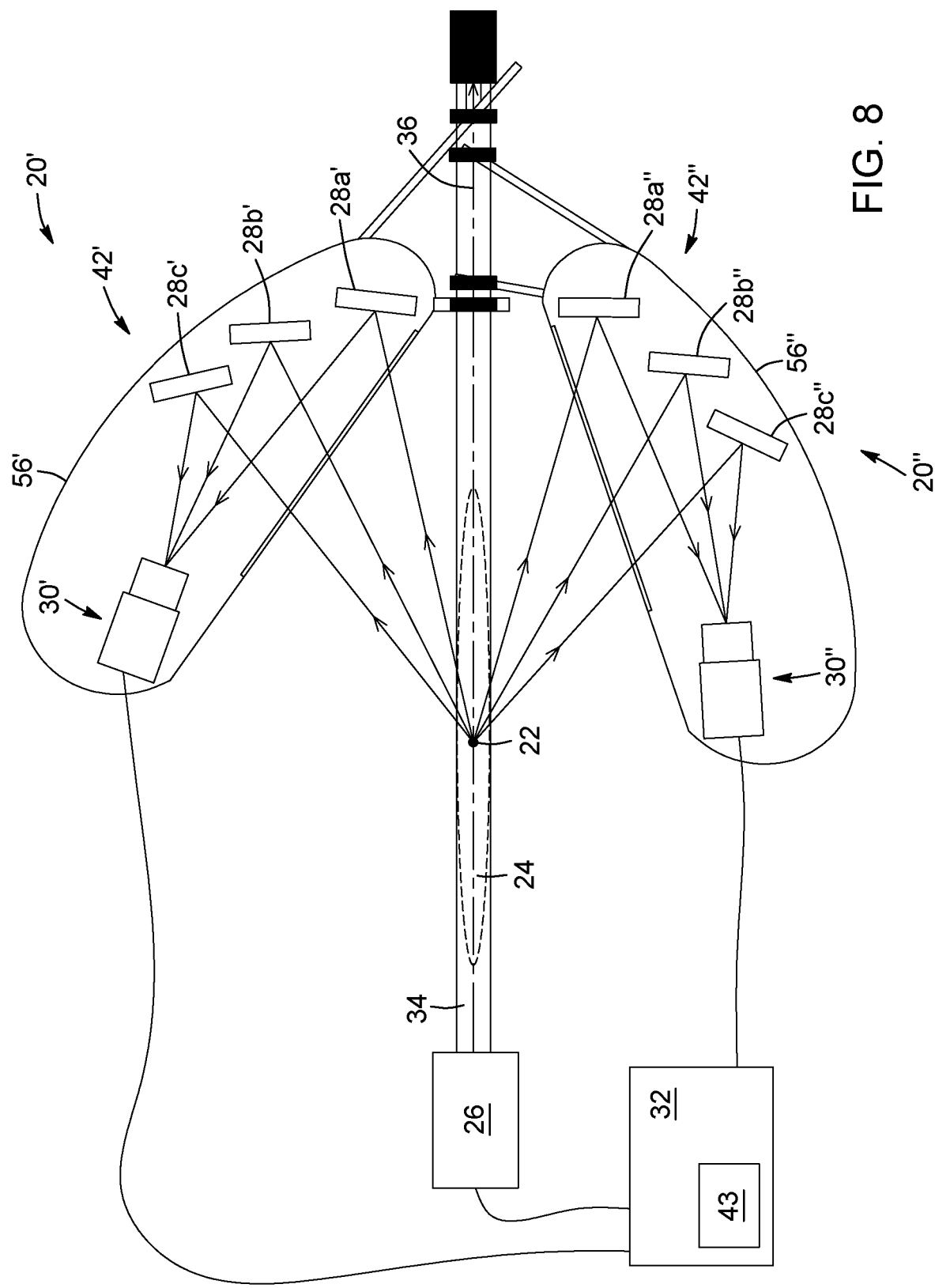
FIG. 8 is a schematic top view of two embodiments of a particle sizing system, the two embodiments sharing the same optical source and the same processing unit.

Turning now to FIG. 8, in some implementations, the same optical source 26 could be used with two distinct imaging modules 42', 42", thus forming two particle sizing systems 20', 20". In FIG. 8, each imaging module 42', 42" includes a housing 56', 56" accommodating therein a plurality of light deflectors 28a' to 28c', 28a" to 28c" and an image capture device 30', 30". The two particle sizing systems 20', 20" could be configured to interrogate substantially the same monitored volume 24 using different arrangements for the light deflectors 28a' to 28c', 28a" to 28c" and the image capture device 30', 30". As a result, the two particle sizing systems 20', 20" can measure scattered intensities at different scattering angles to provide different yet complementary particle size information. In FIG. 8, the two particle sizing systems 20', 20" use the same processing unit 32, although different processing units could alternatively be used. In some cases, the housings 56', 56" of the two imaging modules 42', 42" may be oriented with respect to each other in a manner such that the two particle sizing systems 20', 20" are configured to detect scattered light in two different system planes, for example in two perpendicular system planes. Such a configuration could provide information relative to the shape of the particles 22 in the monitored volume 24.

An advantageous aspect of some embodiments of the present techniques is that the dimensions of the particle sizing system may be scalable. For example, implementations such as depicted in FIGS. 7 and 8 could be deployed in the field for environmental or industrial process emission applications where the light deflectors can be separated from the monitored volume by distances ranging from about a few decimeters to a few meters.

Figure 9:
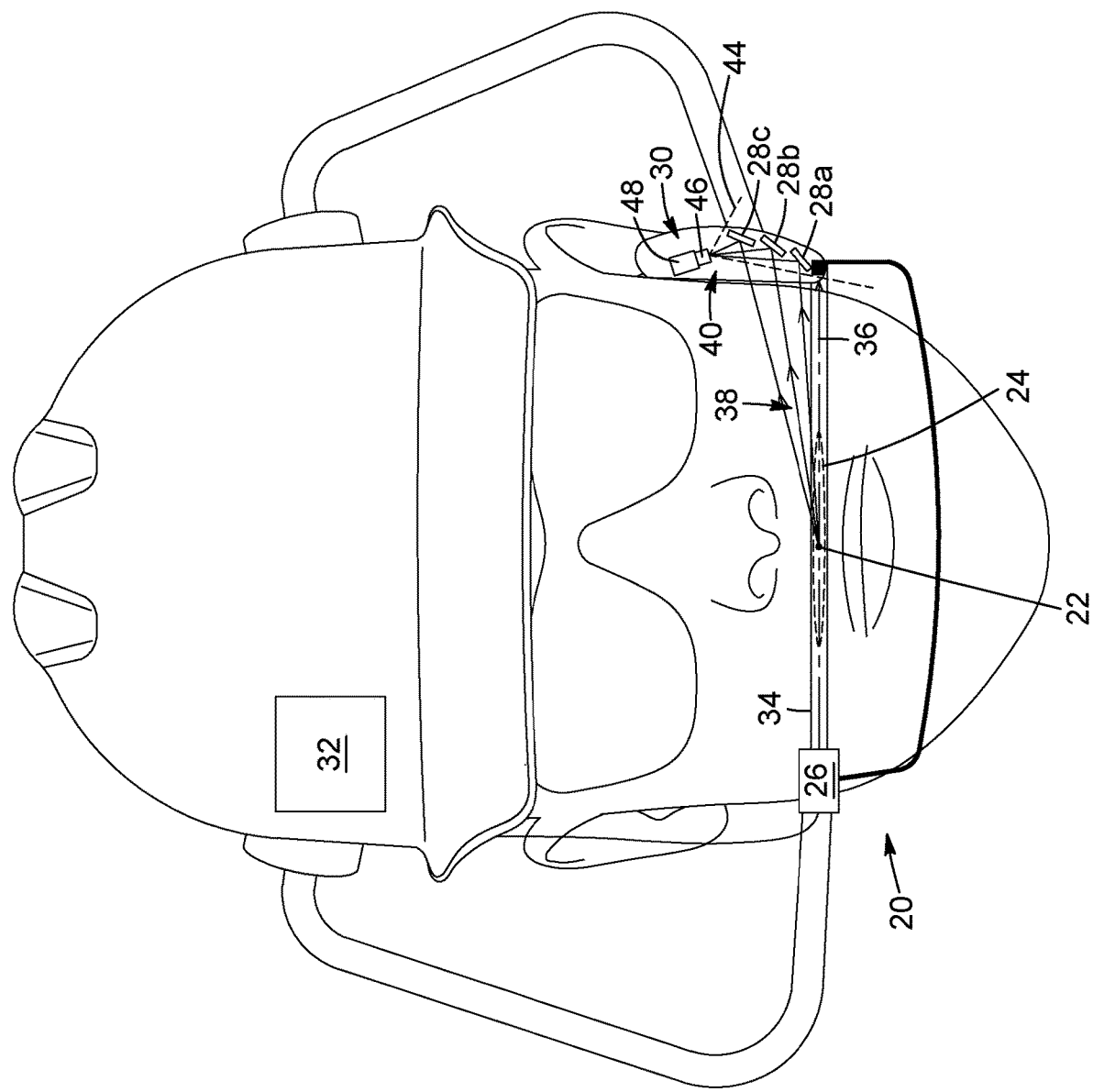
FIG. 9 is a schematic top view of a particle sizing system, in accordance with another embodiment, where the particle sizing system is adapted for use with personal protective equipment.

Referring now FIG. 9, in other implementations, the particle sizing system 20 may be scaled for integration into personal protective equipment such as helmets and safety glasses. In such a case, the characteristic size of and separation between the components of the system 20 can become of the order of a few centimeters. It is also contemplated that such a scaled-down version of the particle sizing system could be implemented on a mobile device equipped with a camera, such as a cell phone, a smartphone or a tablet computer. In such implementations, the image capture device could be embodied by the camera of the mobile device itself. Furthermore, an application or system software could be provided on the mobile device to control and retrieve the images acquired by the camera and to process, either on the mobile device itself or remotely through web- or cloud-based means, the measurement data to obtain particle size information.

Referring now to FIGS. 10 to 14B, other embodiments of a particle sizing system 20 are shown. Again, these embodiments share many features with the embodiment described above with reference to FIG. 5 in that they generally include an optical source 26, a plurality of light deflectors 28a to 28c, an image capture device 30, and a processing unit 32. However, the embodiments of FIGS. 10 to 14B differ from the embodiment of FIG. 5 by the positional configuration used for light deflectors 28*a* to 28*c* and the image capture device 30. Each configuration may have different advantages in terms of the relative dynamic range and the angles of observation.

Figure 10:
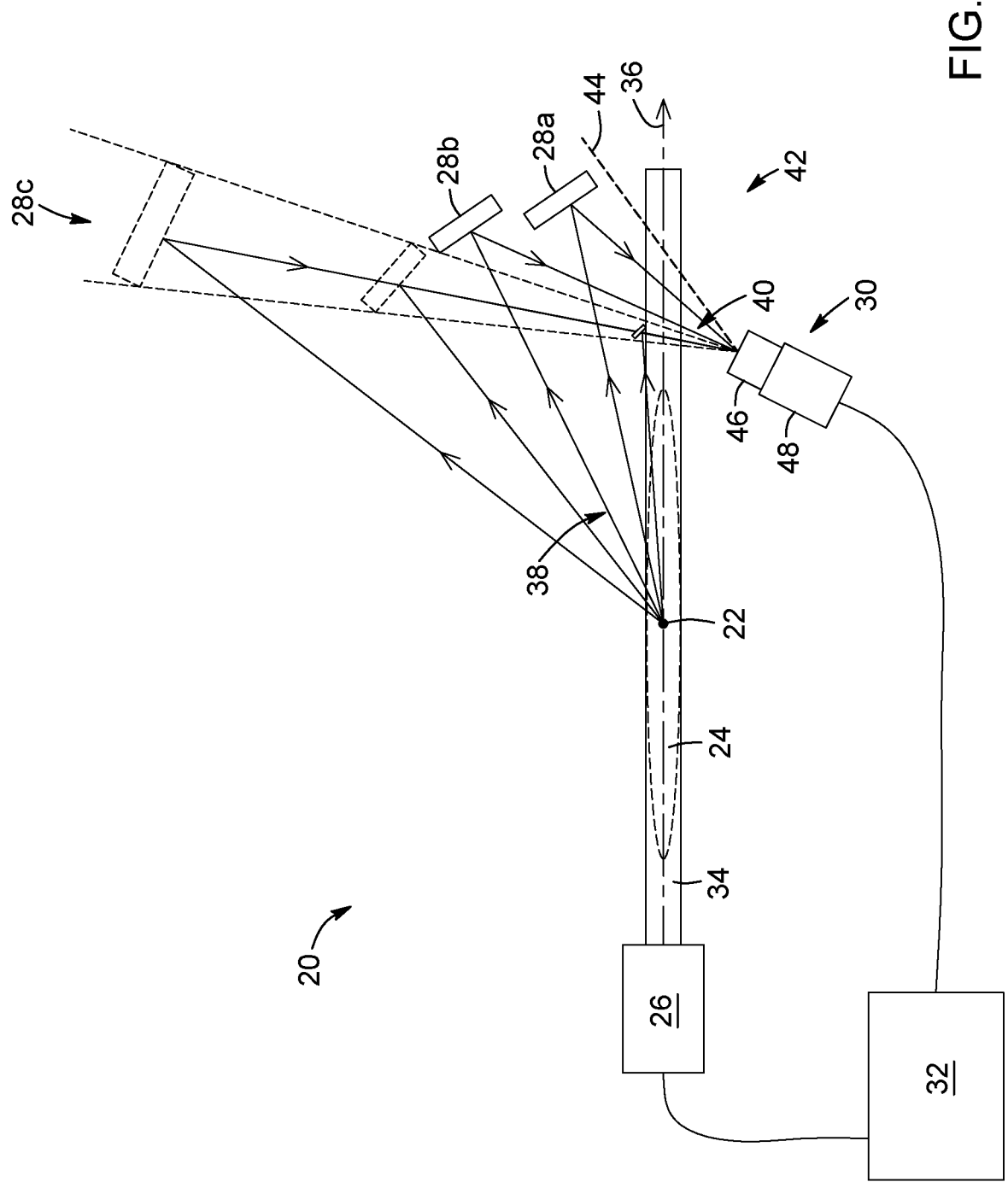
FIG. 10 is a schematic top view of a particle sizing system, in accordance with another embodiment.

Referring first to FIG. 10, the illustrated embodiment of the particle sizing system 20 depicts that by properly changing both the location and the size of one of the light deflectors 28*a* to 28*c* (i.e., the third light deflector 28*c* in FIG. 10), the path length and the observation angle of the scattered light collected by the image capture device 30 can be changed while maintaining the same angular coverage in the field of view 44 of the image capture device 30.

Figure 11:
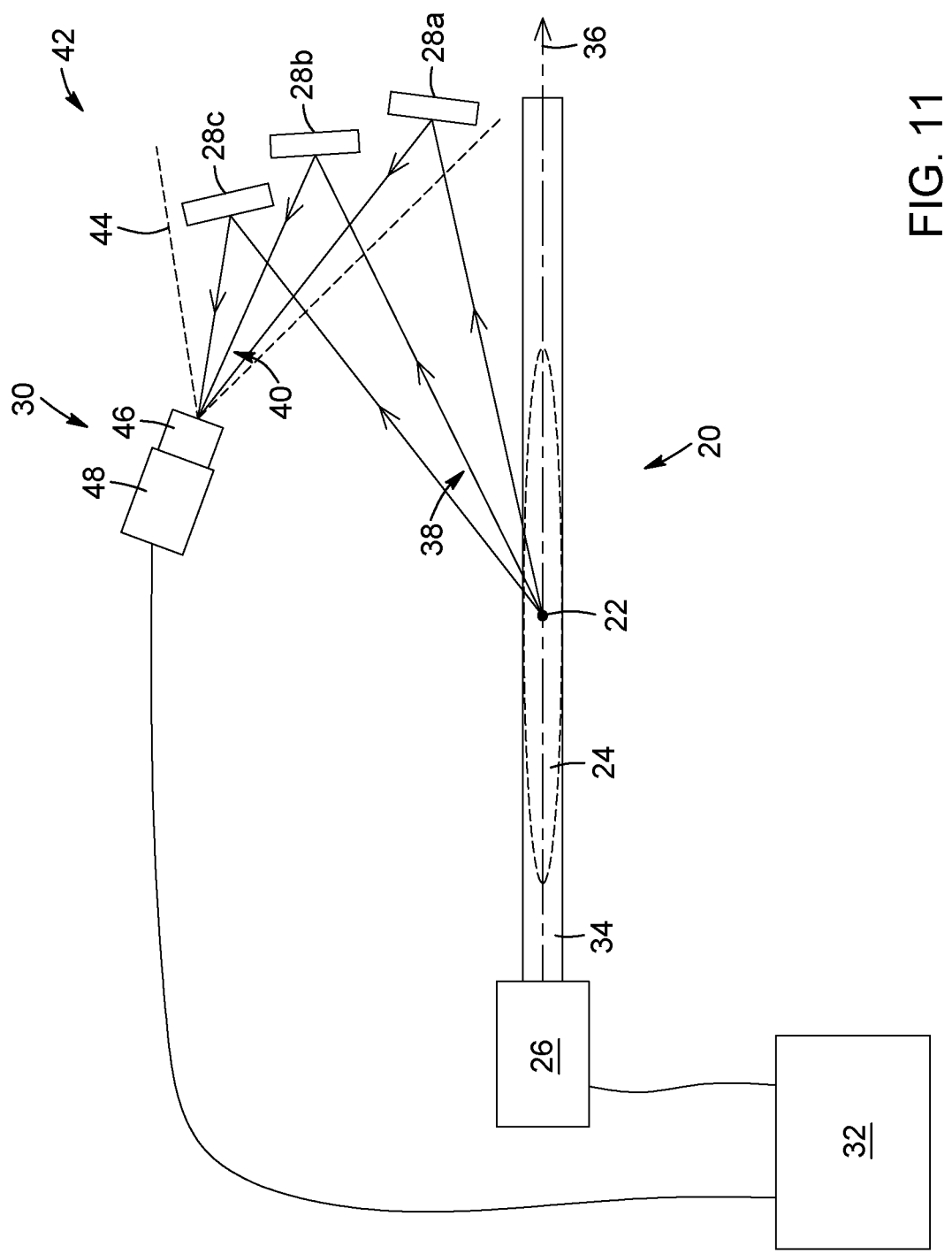
FIG. 11 is a schematic top view of a particle sizing system, in accordance with another embodiment.

Referring now to FIG. 11, there is illustrated another embodiment of the particle sizing system 20. In this embodiment, the locations of the plurality of light deflectors 28*a* to 28*c* are the same as in FIG. 5, but their orientations as well as the position of the image capture device 30 are different. First, it is seen that the image capture device 30 and the plurality of light deflectors 28*a* to 28*c* are all located on the same side of the light beam 34. This means that each one of the plurality of light deflectors 28*a* to 28*c* is positioned to deflect light scattered from the particles 22 away from the optical axis 36 (i.e., the propagation direction of the light beam 34). In other words, the scattered light deflected by each of the light deflectors 28*a* to 28*c* reaches the image capture device 30 without crossing the light beam 34. It will be understood that positioning the image capture device 30 on the same side as the light deflectors 28*a* to 28*c* reduces the likelihood of interference between deflected scattered light (i.e., scattered light collected by the image capture device 30 after deflection from one of the light deflectors 28*a* to 28*c*) and direct scattered light (i.e., scattered light directly collected by the image capture device 30, without prior deflection from one of the light deflectors 28*a* to 28*c*).

Second, the distance between the third light deflector 28*c* and the image capture device 30 in FIG. 11 is shorter when compared to the embodiment illustrated in FIG. 5. If the deflected scattered light from the third light deflector 28*c* is also received in focus on the image capture device 30 while the deflected scattered light from each of the first and second light deflectors 28*a*, 28*b* is received slightly off-focus, then the intensity of the signal measured at the observation angle associated with the third light deflector will be enhanced.

Figure 12:
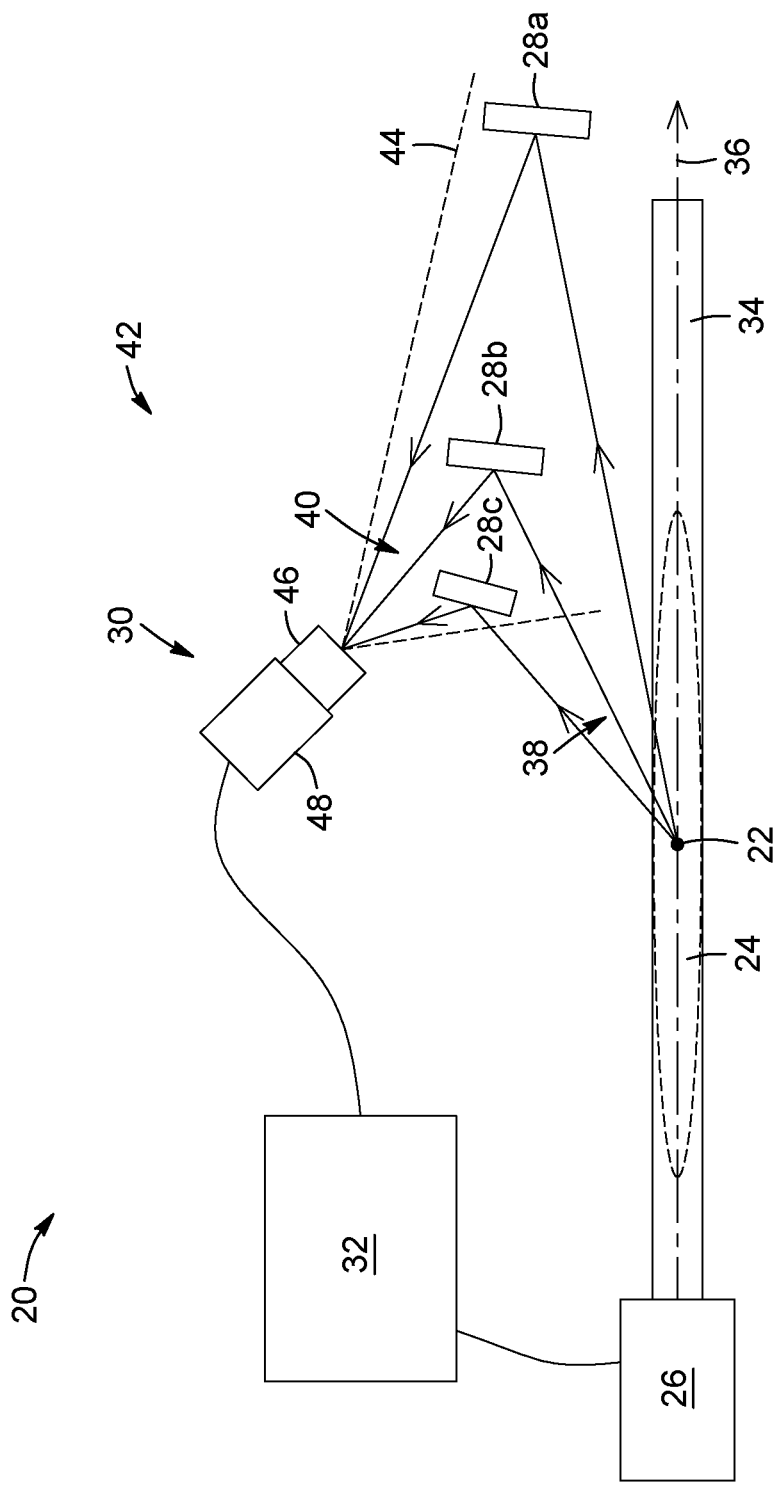
FIG. 12 is a schematic top view of a particle sizing system, in accordance with another embodiment.

Referring to FIG. 12, there is illustrated another embodiment of the particle sizing system 20. In this embodiment, the enhancement of the intensity of the scattered light received from the third light deflector 28*c* could be even greater than in the embodiment of FIG. 11, due to the shorter distance between the third deflector 28*c* and the image capture device 30.

Figure 13:
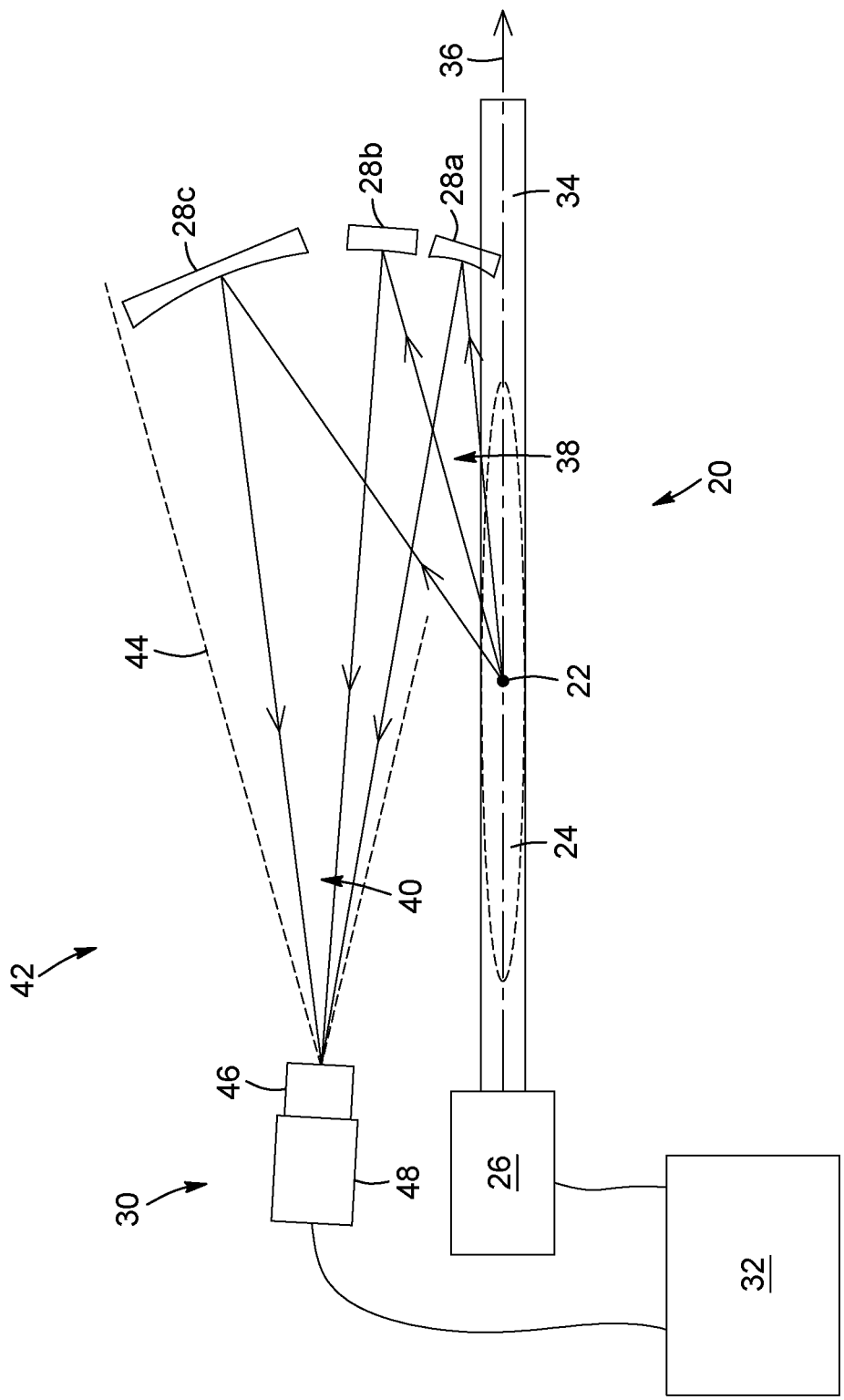
FIG. 13 is a schematic top view of a particle sizing system, in accordance with another embodiment.

Referring to FIG. 13, there is illustrated another embodiment of the particle sizing system 20 in which the plurality of light deflectors 28*a* to 28*c* are embodied by concave mirrors rather than plane mirrors. Concave mirrors not only deflect but also focus at least partly the light 38 scattered from the illuminated particles 22 toward the image capture device 30. As a result, a larger proportion of the deflected scattered light 40 can be collected, thus increasing the signal level on the corresponding pixels of the image. It will also be understood that the mirror curvatures may be selected such that the deflected scattered light is collected in focus for each of the mirrors. In such implementations, the image capture device 30 may not have to be provided with its own imaging optics (e.g., an objective lens). It will be understood that other embodiments of the particle sizing system 20 could alternatively or additionally use convex mirrors as light deflectors.

Another advantage of the embodiment of FIG. 13 is that the angular content of each spot in the image acquired by the image capture device 30 represents a larger range of scattering angles. As mentioned above, each spot represents light scattered from a given particle 22 collected after deflection from a given one of the light deflectors 28*a* to 28*c*. As a result, the oscillations in the angular scattering cross section for larger particles can be reduced, which can facilitate the analysis of the scattering measurement data.

However, using concave rather than plane mirrors generally reduces the size of the monitored volume 24 in each image acquired by the image capture device 30. At the same time, the smaller monitored volume 24 is accompanied by an increase in the spatial resolution achievable with the image capture device 30, and thus, by a decrease in the minimum separation below which adjacent particles cannot be distinguished in the images acquired by the image capture device 30. Therefore, using concave mirrors may be advantageous in the case of large particle concentration levels.

Referring now to FIGS. 14A and 14B, another embodiment of the particle sizing system 20 is illustrated that includes two additional light deflectors 28*d*, 28*e* to collect light 66 backward scattered from the particles 22. In the illustrated embodiment, the fourth light deflector 28*d* is a concave mirror and the fifth light deflector 28*e* is a convex mirror, but other arrangements could be used in other embodiments. The arrangement shown in FIGS. 14A and 14B can ensure or help ensure that the backward scattered light 66 is properly focused on the image capture device 30 for a certain range of scattering angles. In this regard, in the embodiment of FIGS. 14A and 14B, the optical path length of the backward scattered light may significantly exceed the optical path length of forward scattered light. Therefore, if flat rather than curved mirrors were used to redirect backward scattered light onto the image capture device 30, the resulting difference in the scattered intensity of backward and forward scattered light could become large enough to prevent or at least complicate particle size determination, especially considering that the intensity of backward scattered light at a given distance is generally much smaller than the intensity of forward scattered light for particles larger than the light wavelength.

It is also worth mentioning that, in some implementations, valuable information about the composition or refractive index of particles may be retrieved from ratios of forward and backward scattered light. By way of example, combining information on particle composition with information on particle size obtained from scattered light received from the first three light deflectors 28*a* to 28*c* can provide a mean to discriminate individual particles having different compositions, in some case even for particles mixed in an aerosol cloud. In such embodiments, particle size distributions could be determined independently for different particle compositions. By way of example, it is known that dust particles in a smoggy environment may change composition from chemical reactions with smog gases such as, for example, ozone, $NO_x$ and $SO_x$. In such a case, embodiments of the particle sizing system such as that illustrated in FIGS. 14A and 14B could allow the effect of such chemical reactions on particle composition to be assessed in real time and/or for different particle sizes.

Particle Sizing Method

Figure 17:
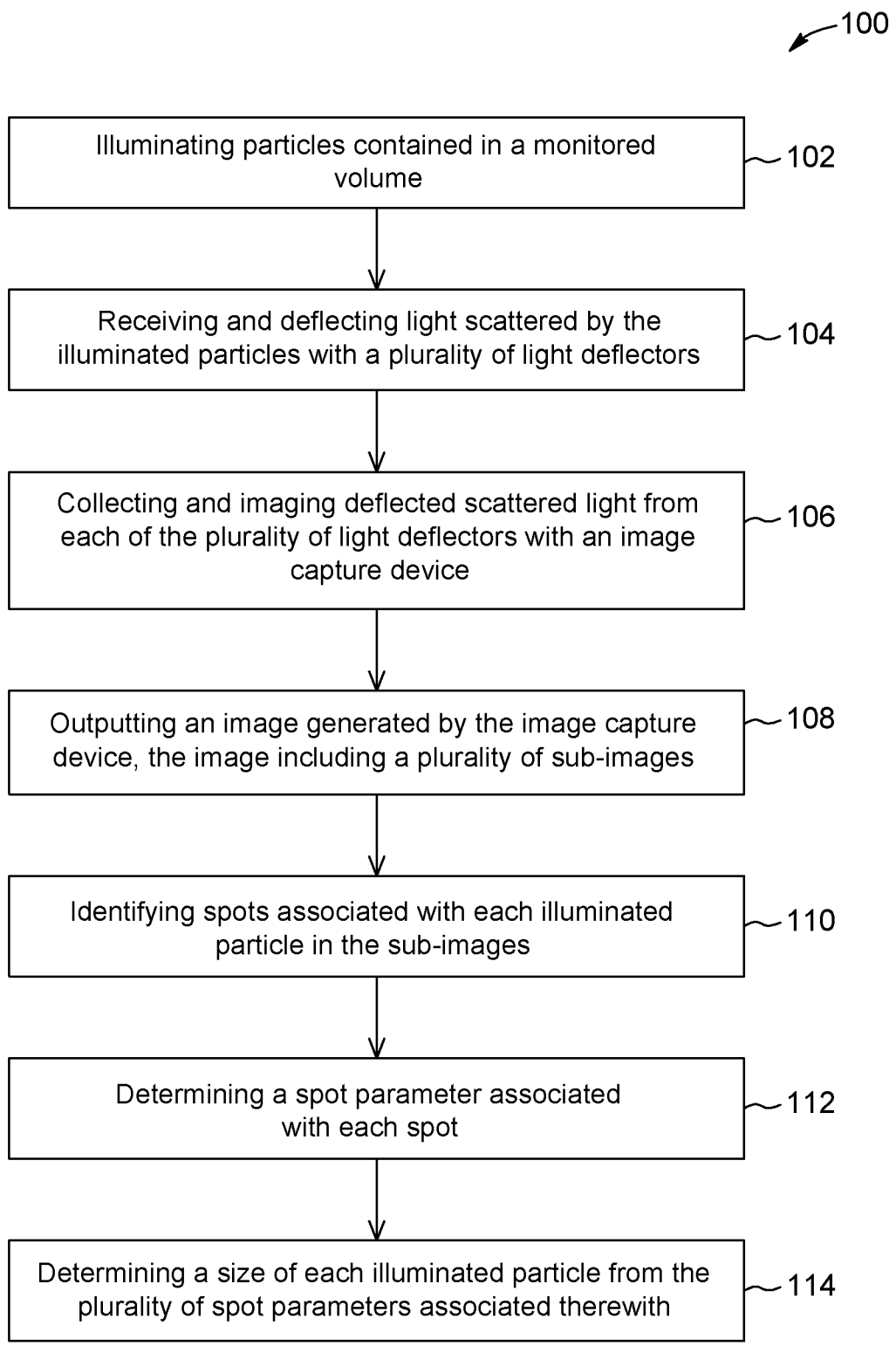
FIG. 17 is a flow chart of a particle sizing method, in accordance with an embodiment.

According to another aspect, there is provided a particle sizing method. FIG. 17 depicts a flow chart of an embodiment of the method 100, which could, by way of example, be performed with a particle sizing system as described above with reference to the embodiments of FIGS. 5 to 15B, or with another particle sizing system.

The method 100 first includes a step 102 of illuminating particles contained in a monitored volume so as to cause a part of the light incident on the particles to be scattered.

The method 100 also includes a step 104 of receiving and deflecting light scattered by the illuminated particles with a plurality of light deflectors. The light deflectors may be embodied by reflecting or refracting optical elements such as, for example, plane and curved mirrors, beam splitters, and prisms. More specifically, each light deflector may be positioned such as to deflect a respective component of the light scattered from each particle in the monitored volume, corresponding to a respective range of scattering angle. In some implementations, the light scattered by the illuminated particles that is received and deflected with the plurality of light deflectors may be forward scattered light.

The method 100 further includes a step 106 of collecting and imaging deflected scattered light from each light deflector with an image capture device. Advantageously, in some implementations, a single image capture device can be used to collect deflected scattered light from each and every one of the plurality of light deflectors.

The method 100 next includes a step 108 of outputting an image generated by the image capture device from the deflected scattered light collected thereby. The image includes a plurality of sub-images, where each sub-image is generated from the collected light deflected from a respective one of the plurality of light deflectors. Each illuminated particle is imaged as a spot in each sub-image, such that the plurality of spots associated with a given particle corresponds to light scattered by this particle at a plurality of different scattering angles.

The method 100 also includes a step 110 of identifying the plurality of spots associated with each illuminated particle in the plurality of sub-images. In particular, with proper knowledge or calibration of the relative positions of the light beam illuminating the particles, the light deflectors and the image capture device acquiring the image of the monitored volume, it may be possible to associate a location in the monitored volume with each spot in each sub-image. In other words, it may be possible to determine where the light scattered by each illuminated particle at a particular location in the monitored volume will form a spot in each of the sub-images after deflection from the corresponding one of the light deflectors.

The method 100 next includes a step 112 of determining, for each illuminated particle, a spot parameter associated with each spot of the plurality of spots, followed by a step 114 of determining a size of each illuminated particle from the plurality of spot parameters associated therewith. In some implementations, the step 112 of determining a spot parameter associated with each of the spots may include determining an energy parameter indicative of an amount of optical energy contained in the spot associated therewith. In other implementations, the spot parameters may correspond to a size, a shape, a polarization or a spectral content of the spots, or any combination thereof.

In some implementations, the step 114 of determining the size of each illuminated particle can include calculating or otherwise obtaining one or more ratios of the spot parameters associated with each illuminated particle, and comparing the one or more ratios with reference data. By way of example, the reference data can be obtained from a numerical or analytical model based on the Mie scattering theory or another suitable theoretical framework allowing a reference scattering response of the particles to be obtained. In particular, the manner of obtaining the reference data is not meant to limit the scope of application of the present method 100.

It is worth mentioning that the method 100 described herein may employ relative signals rather than absolute signals. In some embodiments, the use of relative signals or ratios can make the particle sizing method 100 less sensitive to uniformity fluctuations in the transverse irradiance profile of the light beam illuminating the particles. As a result, when ratios of scattered signals are used for particle sizing, the beam of light may not need to fulfill specific requirements in terms of uniformity and/or power stability. Also, the location of the illuminated particles may vary within the monitored volume without degrading the validity of the size determination.

Of course, numerous modifications could be made to the embodiments described above without departing from the scope of the present invention.

The invention claimed is:

1. A system for particle analysis using light scattering, the system comprising:
   a plurality of light deflectors configured to deflect light scattered by particles in response to illumination light;
   an image capture device configured to collect scattered light deflected by the plurality of light deflectors and generate from the collected scattered light an image comprising a plurality of sub-images respectively associated with the plurality of light deflectors, the plurality of sub-images representing the light scattered by the particles in a respective plurality of scattering angle ranges; and
   a processor configured to receive the image from the image capture device, analyze the plurality of sub-images of the image, and determine therefrom one or more characteristics of the particles.

2. The system of claim 1, further comprising an optical source configured to generate the illumination light to illuminate the particles.

3. The system of claim 2, wherein the optical source comprises one or a plurality of monochromatic light sources.

4. The system of claim 1, wherein the processor is configured to identify the particles as spots in the plurality of sub-images and determine the one or more characteristics of the particles from size, shape, location, intensity, polarization, temporal, or spectral information associated with the identified spots, or a combination thereof.

5. The system of claim 1, wherein the light deflectors comprise light reflectors.

6. The system of claim 1, wherein the light deflectors comprise optical filters to deflect light scattered by the particles in a spectrally selective manner.

7. The system of claim 1, wherein the image capture device has spectrally resolved imaging capabilities, temporally resolved imaging capabilities, or both.

8. The system of claim 1, wherein the collected scattered light comprises scattered light that is wavelength-shifted with respect to the illumination light.

9. The system of claim 8, wherein the wavelength-shifted scattered light comprises fluorescent light.

10. The system of claim 1, wherein the one or more characteristics of the particles comprise composition information.

11. The system of claim 10, wherein the one or more characteristics of the particles further comprise size, shape, phase, or position information, or a combination thereof.

12. A method of particle analysis using light scattering, comprising:

illuminating particles with illumination light; deflecting, with a plurality of light deflectors, light scattered by the particles in response to the illumination light;

using an image capture device to collect scattered light deflected by the plurality of light deflectors, and generating, from the collected scattered light, an image comprising a plurality of sub-images respectively associated with the plurality of light deflectors, the plurality of sub-images representing the light scattered by the particles in a respective plurality of scattering angle ranges and conveying information indicative of one or more characteristics of the particles; and analyzing the plurality of sub-images and determining therefrom the one or more characteristics of the particles.

13. The method of claim 12, wherein analyzing the plurality of sub-images comprises identifying spots associated with the particles in the plurality of sub-images, and wherein determining the one of more characteristics of the particles comprises assessing size, shape, location, intensity, polarization, temporal, or spectral information relating to the spots, or a combination thereof.

14. The method of claim 12, wherein deflecting light scattered by the particles comprises deflecting light scattered by the particles in a spectrally selective manner.

15. The method of claim 12, wherein the collected scattered light comprises scattered light that is wavelength-shifted with respect to the illumination light.

16. The method of claim 12, wherein the collected scattered light comprises fluorescent light.

17. The method of claim 12, wherein determining the one or more characteristics of the particles comprise determining composition information.

18. The method of claim 17, wherein determining the one or more characteristics of the particles further comprises determining size, shape, phase, or position information about the particles, or a combination thereof.

19. A system for fluorescence-based particle analysis, the system comprising:

an optical source configured to illuminate particles with illumination light;

a plurality of light deflectors configured to deflect, in a spectrally sensitive manner, fluorescent scattered light emitted by the particles in response to the illumination light;

an image capture device configured to collect fluorescent scattered light deflected by the plurality of light deflectors and generate an image from the collected fluorescent scattered light, the image comprising a plurality of sub-images respectively associated with the plurality of light deflectors, the plurality of sub-images representing the fluorescent light scattered by the particles in a respective plurality of scattering angle ranges and conveying composition information about the particles; and a processor configured to receive the image from the image capture device, analyze the plurality of sub-images of the image, and determine therefrom the composition information about the particles.

* * * * *